(12) United States Patent
Kuriyama

(10) Patent No.: US 7,031,141 B2
(45) Date of Patent: Apr. 18, 2006

(54) SOLID ELECTROLYTIC CAPACITOR AND ELECTRIC CIRCUIT

(75) Inventor: Chojiro Kuriyama, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 0 days.

(21) Appl. No.: 11/023,300

(22) Filed: Dec. 27, 2004

(65) Prior Publication Data

US 2005/0207090 A1    Sep. 22, 2005

(30) Foreign Application Priority Data

Dec. 26, 2003  (JP) .............................. 2003-434753

(51) Int. Cl.
    *H01G 9/04* (2006.01)
    *H01G 4/228* (2006.01)

(52) U.S. Cl. ....................... 361/528; 361/533; 361/540

(58) Field of Classification Search ........ 361/532–529, 361/538, 540–541
See application file for complete search history.

(56) References Cited

U.S. PATENT DOCUMENTS

| 6,741,451 | B1 * | 5/2004 | Aoyama ..................... 361/528 |
| 6,836,401 | B1 * | 12/2004 | Yoshida et al. ............. 361/538 |
| 6,873,518 | B1 * | 3/2005 | Masuda et al. ............. 361/525 |
| 6,912,117 | B1 * | 6/2005 | Arai et al. .................. 361/523 |
| 2005/0168920 | A1 * | 8/2005 | Arai et al. .................. 361/528 |

FOREIGN PATENT DOCUMENTS

| JP | 2003-158042 | 5/2003 |
| JP | 2003-163137 | 6/2003 |

\* cited by examiner

*Primary Examiner*—Eric W. Thomas
(74) *Attorney, Agent, or Firm*—Hamre, Schumann, Mueller & Larson, P.C.

(57) ABSTRACT

A solid electrolytic capacitor includes a cathode including a solid electrolytic layer, an anode, and a dielectric layer provided between the cathode and the anode. The anode includes an anode body, an input anode terminal and an output anode terminal. A bypass current path for causing circuit current to detour around the anode body is formed between the input anode terminal and the output anode terminal.

29 Claims, 22 Drawing Sheets

SOLID ELECTROLYTIC CAPACITOR AND ELECTRIC CIRCUIT

BACKGROUND OF THE INVENTION

1. Field of the Invention

The present invention relates to a solid electrolytic capacitor. The invention also relates to an electric circuit using a solid electrolytic capacitor.

2. Description of the Related Art

As an example of solid electrolytic capacitor, there exists a so-called three-terminal solid electrolytic capacitor. (See JP-A 2003-158042, for example.) In such a solid electrolytic capacitor, the circuit current flows from an input anode terminal through an anode body toward an output anode terminal for realizing low impedance in a wide frequency range.

For example, JP-A 2003-163137 discloses a solid electrolytic capacitor which is excellent in terms of high capacitance, low ESL (equivalent series inductance) and low ESR (equivalent series resistance). The capacitor includes an anode body formed of a porous sintered body made of so-called "valve metal" such as tantalum or niobium.

The solid electrolytic capacitor having the above-described structure is used as connected between an electronic device such as a CPU and a power source circuit as a bypass capacitor, for example. Recently, in accordance with an increase in the operation speed and digitalization of electronic devices, a power source system with high stability and high response speed is demanded. Therefore, also with respect to a solid electrolytic capacitor used for noise cancellation and stabilization of a power system, excellent noise cancellation ability for a wide frequency range and high-speed response in power supply are required. Further, in accordance with high current power supply, high capacitance and high tolerable power loss are also demanded strongly.

Generally, the frequency characteristics of the impedance Z of a solid electrolytic capacitor is determined based on the following formula:

$$Z=\sqrt{(R^2+(1/\omega C-\omega L)^2)}$$

($\omega$: $2\pi f$ (f: Frequency), C: Capacitance, R: Resistance, L: Inductance))

As will be understood from the above formula, in a frequency range lower than the self resonant point, $1/\omega C$ becomes dominant, so that the impedance can be reduced by increasing the capacitance C. In a high frequency range around the self resonant point, the resistance R becomes dominant, so that the ESR need be reduced to reduce the impedance. For example, a porous sintered body whose surface area is increased for increasing the capacitance is advantageous to reduce the ESR. As another conventional means for reducing the ESR, the cathode may be made of manganese dioxide or conductive polymer. However, in an ultra high frequency range higher than the self resonant point, $\omega L$ becomes dominant, so that the ESL need be reduced to reduce the impedance. Since the ESL increases as the volume of the porous sintered body increases, to reduce the impedance in the ultra high frequency range becomes more difficult as the capacitance of the capacitor is increased.

In the three-terminal solid electrolytic capacitor disclosed in JP-A 2003-158042, the ESL is reduced by the structure in which the circuit current flows through the anode body. Recently, however, an electronic device as the object of power supply often requires high direct current. For example, when the driving current for a HDD (hard disk drive) is included in the circuit current, the increase of the current is considerable. When a high current flows through the anode body of the tree-terminal solid electrolytic capacitor, the amount of heat generated in the solid electrolytic capacitor increases. Particularly, when the anode body comprises a porous sintered body made of a valve metal and an anode wire is partially embedded in the porous sintered body, significant local temperature increase occurs at the junction between the porous sintered body and the anode terminal. Further, the heating of the porous sintered body may cause cracking of the sealing resin covering the porous sintered body, which need be prevented. In this way, conventionally, it is difficult to improve the high frequency characteristics by reducing the ESL while increasing the tolerable power loss in accordance with the increase of the circuit current.

SUMMARY OF THE INVENTION

The present invention is conceived under the circumstances described above. It is, therefore, an object of the present invention to provide a solid electrolytic capacitor which has large capacitance, low ESR and low ESL and which is capable of suppressing heat generation to cope with an increase of the current and enhancing the tolerable power loss. Another object of the present invention is to provide an electric circuit utilizing such a solid electrolytic capacitor.

According to a first aspect of the present invention, there is provided a solid electrolytic capacitor comprising a cathode including a solid electrolytic layer, an anode, and a dielectric layer provided between the cathode and the anode. The anode includes an anode body, an input anode terminal and an output anode terminal. A bypass current path for causing circuit current to detour around the anode body is formed between the input anode terminal and the output anode terminal.

Preferably, the electrical resistance of the bypass current path is lower than the equivalent series resistance of the anode body.

Preferably, the cathode is provided with a cathode terminal electrically connected to the solid electrolytic layer, and the inductance of the bypass current path is higher than the equivalent series resistance of a route from the input anode terminal to the cathode terminal through the anode body.

Preferably, the cathode is provided with a cathode terminal electrically connected to the solid electrolytic layer, and the inductance of the bypass current path is lower than the equivalent series resistance of a route from the input anode terminal to the cathode terminal through the anode body.

Preferably, the anode body comprises a porous sintered body made of valve metal, and each of the input anode terminal and the output anode terminal comprises a wire partially embedded in the porous sintered body. The bypass current path is provided by a conductive member connected to both of the input anode terminal and the output anode terminal.

Preferably, the conductive member comprises a metal cover which covers the porous sintered body at least partially.

Preferably, the metal cover includes a portion which forms the bypass current path and which is formed with a slit.

Preferably, the metal cover includes a portion which forms the bypass current path and which is formed with a bent portion.

Preferably, an insulating member for providing insulation between the metal cover and the porous sintered body intervenes between the cover and the sintered body.

Preferably, the insulating member includes a film made of resin.

Preferably, the insulating member includes a plate made of a ceramic material.

Preferably, the metal cover is formed with a plurality of holes.

Preferably, the solid electrolytic capacitor further comprises a plurality of external anode terminals for surface mounting and a plurality of external cathode terminals for surface mounting. In this case, each of the external anode terminals is electrically connected to the input anode terminal or the output anode terminal. The external cathode terminals are electrically connected to the solid electrolytic layer.

Preferably, the solid electrolytic further comprises a metal piece including a center portion and end portions which are different in height from the center portion. The center portion includes a first surface bonded to the solid electrolytic layer and a second surface which is opposite from the first surface and covered by resin. The end portions provide the external cathode terminals.

Preferably, the plurality of external cathode terminals comprise a plurality of metal pieces spaced from each other.

Preferably, the solid electrolytic further comprises a cathode conductor plate provided on a bottom surface side of the porous sintered body and electrically connected to the solid electrolytic layer, and an anode conductor plate serving as the conductive member, the anode conductor plate being stacked to the cathode conductor plate via an insulating member and electrically connected to the anode terminals. At least part of the cathode conductor plate serves as an external cathode terminal, and at least part of the anode conductor plate serves as a plurality of external anode terminals.

Preferably, the cathode conductor plate includes a main plate portion bonded to the porous sintered body and an extension extending from the main plate portion. The extension serves as the external cathode terminal. The main plate portion and the extension differ from each other in height so that respective bottom surfaces of the external anode terminals and the external cathode terminal are generally flush with each other.

Preferably, the capacitor includes a plurality of flat porous sintered bodies.

Preferably, the solid electrolytic capacitor further comprises a plurality of external anode terminals each of which is electrically connected to input anode terminals or output anode terminals provided at the porous sintered bodies, and external cathode terminals for surface mounting electrically connected to each of the solid electrolytic capacitors formed at the porous sintered bodies.

Preferably, the plurality of flat sintered bodies are stacked together.

Preferably, the solid electrolytic capacitor further comprises a plurality of metal plates intervening between the flat sintered bodies and respectively connected electrically to the solid electrolytic layers formed at the sintered bodies. The external cathode terminals are stacked to the flat porous sintered bodies in the same direction as the stacking direction of the sintered bodies. The metal plates and the external cathode terminals are electrically connected to each other by a connection member extending in the stacking direction.

Preferably, the plurality of flat sintered bodies are arranged in parallel.

According to a second aspect of the present invention, there is provided an electric circuit comprising a solid electrolytic capacitor, and a bypass current path. The solid electrolytic capacitor includes a cathode including a solid electrolytic layer, an anode body provided at the cathode via a dielectric layer, and an input anode terminal and an output anode terminal for enabling circuit current to flow through the anode body. The bypass current path causes the circuit current to detour around the anode body between the input anode terminal and the output anode terminal.

Preferably, the electrical resistance of the bypass current path is lower than the equivalent series resistance of the anode body between the input anode terminal and the output anode terminal.

Preferably, the cathode is provided with a cathode terminal electrically connected to the solid electrolytic layer. The inductance of the bypass current path is higher than equivalent series resistance of the solid electrolytic capacitor in a route from the input anode terminal to the cathode terminal through the anode body.

Preferably, the cathode is provided with a cathode terminal electrically connected to the solid electrolytic layer. The inductance of the bypass current path is lower than the equivalent series resistance of the solid electrolytic capacitor in a route from the input anode terminal to the cathode terminal through the anode body.

Preferably, the solid electrolytic capacitor is mounted on a substrate, and the bypass current path is provided by a wiring pattern formed on the substrate.

Preferably, the wiring pattern is formed with a bent portion.

Preferably, the bypass current path is provided with a coil element.

DETAILED DESCRIPTION OF THE PREFERRED EMBODIMENTS

Preferred embodiments of the present invention will be described below in detail with reference to the accompanying drawings.

Figure 1:
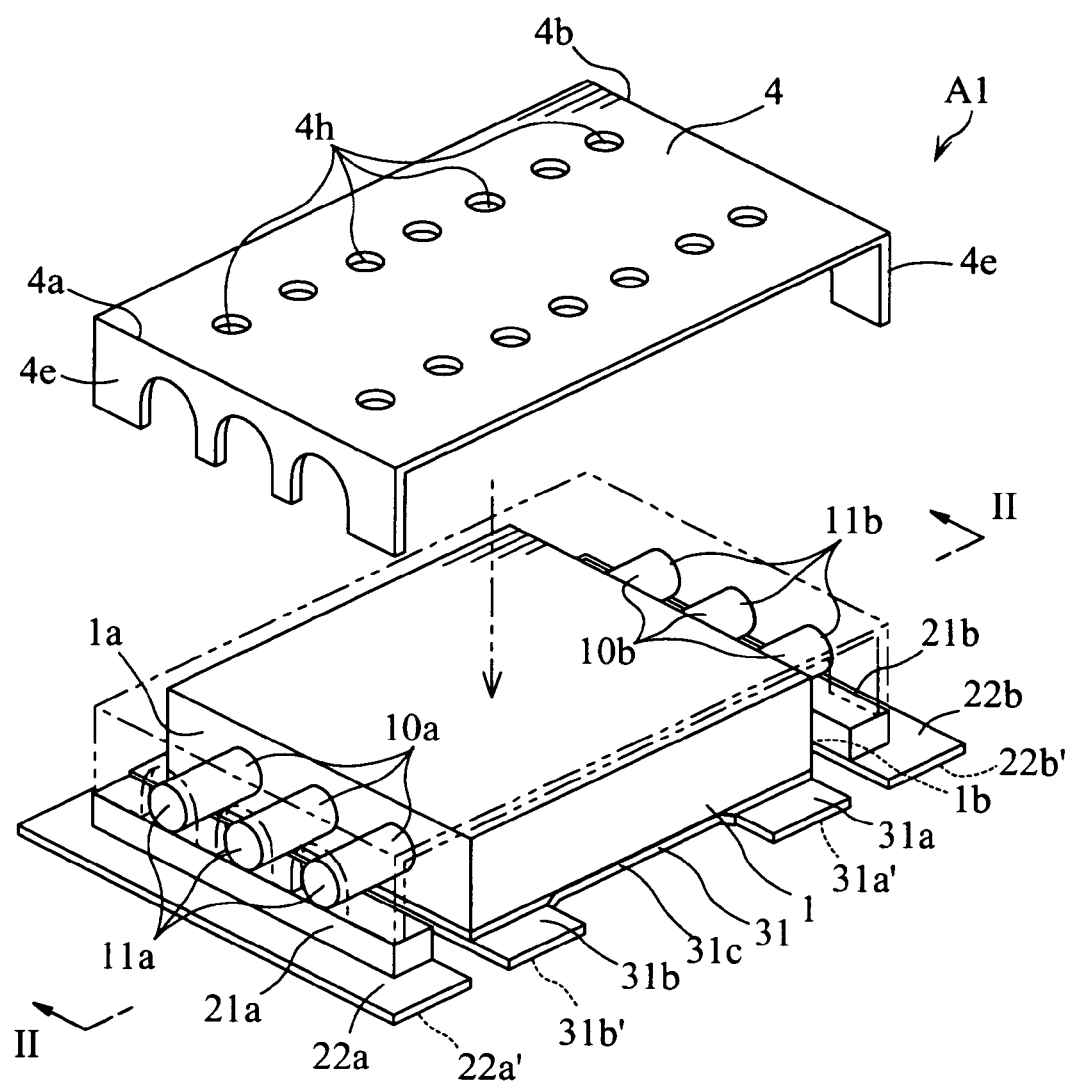
FIG. 1 is a perspective view showing a solid electrolytic capacitor according to a first embodiment of the present invention.
Figure 2:
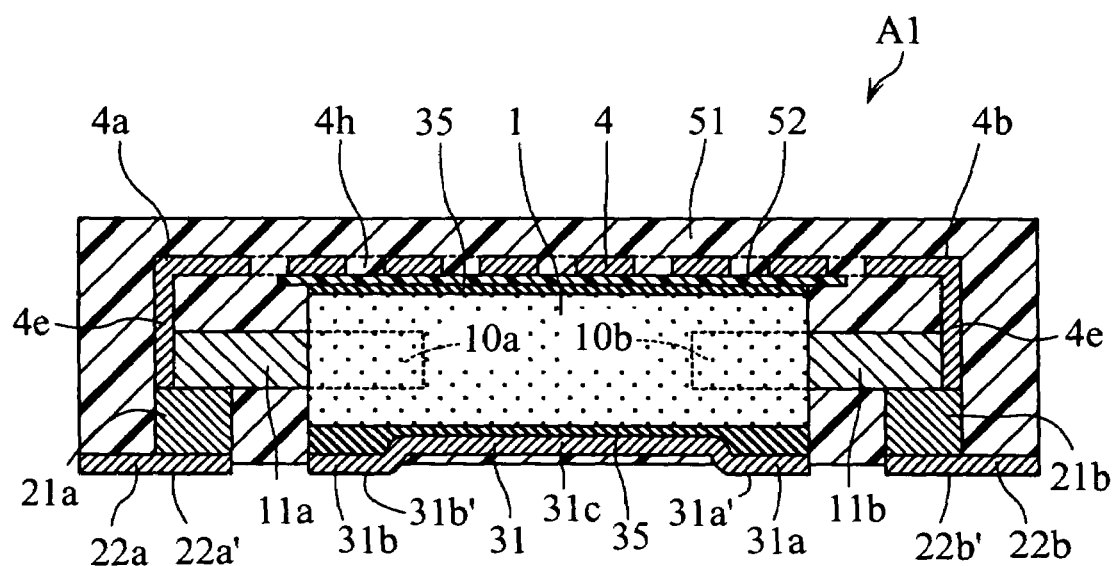
FIG. 2 is a sectional view taken along lines II—II in FIG. 1.

FIGS. 1 and 2 show a solid electrolytic capacitor according to a first embodiment of the present invention. The illustrated solid electrolytic capacitor A1 includes a porous sintered body 1, six anode wires 10a and 10b, and a metal cover 4. As shown in FIG. 2, the solid electrolytic capacitor A1 further includes a sealing resin 51 covering the porous sintered body 1. In FIG. 1, the sealing resin 51 is omitted.

The porous sintered body 1 is made of niobium which is a kind of so-called "valve metal". Specifically, the porous sintered body 1 is made by compacting niobium powder into the form of a rectangular plate and then sintering the compacted body. The porous sintered body 1 is an example of anode body of the present invention. On the porous sintered body 1 is formed a dielectric layer (not shown), on which a solid electrolytic layer (not shown) is formed. The solid electrolytic layer constitutes a cathode of the present invention. As the material of the porous sintered body 1, tantalum, for example, may be used instead of niobium. However, since niobium is superior in flame retardancy to tantalum, niobium is preferable as the material of the porous sintered body 1 which is heated in use.

Similarly to the porous sintered body 1, the six anode wires 10a, 10b are made of valve metal (e.g. niobium). Among these anode wires, three anode wires 10a for inputting extend into the porous sintered body 1 through a first side surface 1a of the porous sintered body 1, whereas the other three anode wires 10b for outputting extend into the porous sintered body 1 through a second side surface 1b which is on the opposite side of the first side surface 1a. The portions of the input and output anode wires 10a, 10b which project from the porous sintered body 1 are input and output anode terminals 11a and 11b. The anode terminals 11a, 11b are electrically connected to external anode terminals 22a, 22b for inputting and outputting via conductive members 21a, 21b. The external anode terminals 22a, 22b are partially covered by a sealing resin 51, which will be described later. The exposed portions 22a', 22b' of the external anode terminals 22a, 22b are utilized for surface-mounting the solid electrolytic capacitor A1.

The metal cover 4 may be made of e.g. copper and has a configuration capable for housing the porous sintered body 1. In the example shown in FIG. 1, the cover 4 includes an elongated rectangular upper plate portion formed with a plurality of holes 4h, and two upright portions 4e integrally formed on the upper plate portion. Each of the upright portions 4e extends downward from an end (bent portion) 4a or 4b of the upper plate portion. As indicated by double-dashed lines in FIG. 1, the two upright portions 4e are arranged to come into direct contact with the conductive members 21a and 21b, respectively. As a result, a bypass current path for allowing the circuit current to detour around the porous sintered body 1 is defined between the anode terminals 11a and 11b. The metal cover 4 is made of copper which is higher in conductivity than niobium which is the material of the porous sintered body 1 and generally equal in width to the porous sintered body 1. Therefore, the resistance of the cover 4 is relatively low. Further, the provision of the upright portions 4e and the bent portions 4a, 4b makes the inductance with respect to alternating current relatively high. For these reasons, the electrical resistance of the bypass current path is lower than the equivalent series resistance of the porous sintered body 1 between the anode terminals 11a and 11b. Further, the inductance of the bypass current path ("bypass inductance") is made higher than the equivalent series inductance ("equivalent series inductance") of the route extending from the input anode terminals 11a to the external cathode terminals 31a, 31b (which will be described later) through the porous sintered body 1.

The resin film 52 serves to provide insulation between conductive resin 35 formed on the porous sintered body 1 and the metal cover 4 and is bonded to the conductive resin 35 and the metal cover 4 with an adhesive (not shown). As the resin film 52, use may be made of a polyimide film (e.g. Kapton (registered trademark) available from DuPont). Since a polyimide film has excellent heat resistance and good insulation properties, it is unlikely to change in quality even when heated to a relatively high temperature in the manufacturing process of the solid electrolytic capacitor A1. Therefore, the use of a polyimide film is suitable for enhancing the insulation between the metal cover 4 and the conductive film 35.

A metal plate 31 is bonded to a solid electrolytic layer (not shown) formed at a lower surface of the porous sintered body 1. The metal plate 31 is made of Cu alloy or Ni alloy, for example. The metal plate 31 is so bent that the center portion (projection) 31c thereof is positioned higher than opposite ends thereof. The opposite ends serve as external cathode terminals 31a, 31b. The upper surface of the center portion 31c is bonded to the solid electrolytic layer of the porous sintered body 1 via the conductive resin 35, whereas the lower surface of the center portion 31c is covered by sealing resin 51, which will be described later. The lower surfaces 31a' and 31b' of the external cathode terminals 31a and 31b are used for surface-mounting the solid electrolytic capacitor A1.

The sealing resin 51 covers the porous sintered body 1, the anode wires 10a and 10b, and the metal cover 4 to protect these parts. Since the metal cover 4 is formed with a plurality of holes 4h, the portion around the anode wires 10a and 10b can be easily impregnated with the sealing resin 51, which is desirable for the insulation and protection of the anode wires 10a and 10b. The insulation between the solid electrolytic layer and the metal cover 4 may be performed by forming a porous resin portion between these parts and impregnating the resin portion with the sealing resin 51.

Next, the operation and advantages of the solid electrolytic capacitor A1 will be described taking the electric circuit shown in FIG. 3 as an example.

Figure 3:
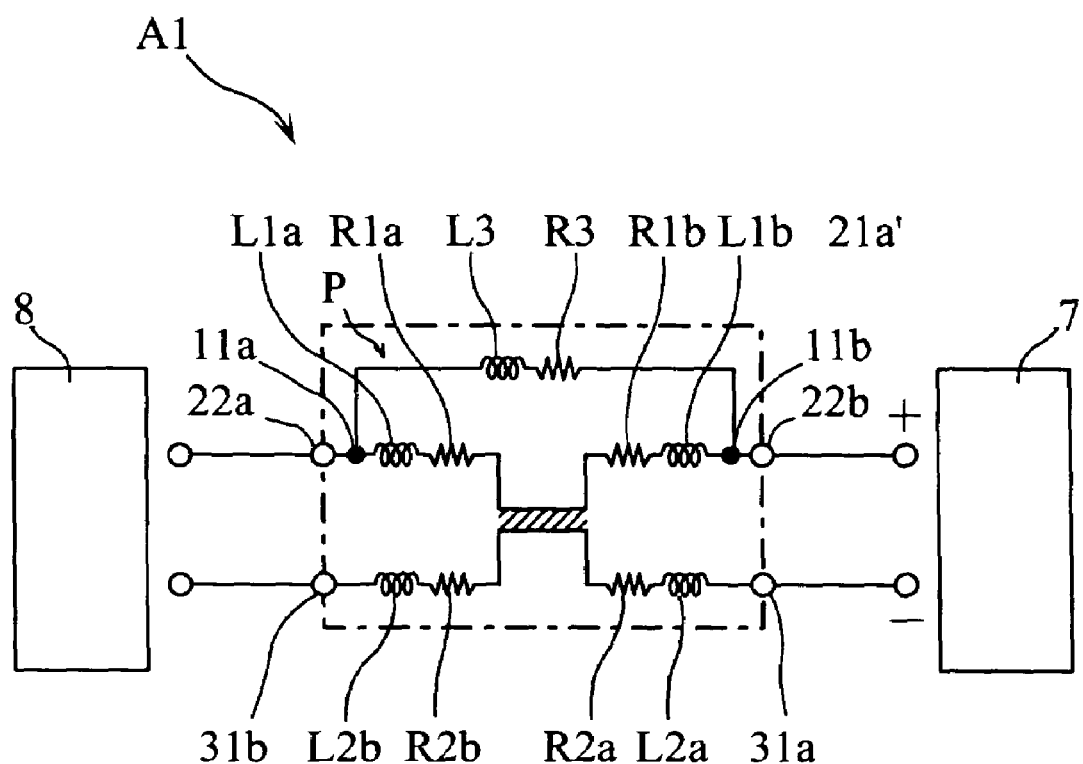
FIG. 3 is a circuit diagram of an electric circuit using the solid electrolytic capacitor of FIG. 1.

The electric circuit shown in FIG. 3 is a combination of a solid electrolytic capacitor A1, a circuit 7 which is a target of noise cancellation and power supply by the solid electrolytic capacitor A1, and a power supply unit 8. The circuit 7 may include a CPU, an IC or a HDD, for example. The solid electrolytic capacitor A1 is connected between the circuit 7 and the power supply unit 8 and used for supplying power to the circuit 7 and preventing unnecessary noise generated at the circuit 7 from leaking to the power supply unit 8. As clearly shown in the figure, the solid electrolytic capacitor A1 is of a type that has four terminals including external anode terminals 22a and 22b for inputting and outputting and external cathode terminals 31a and 31b for inputting and outputting. Such a structure has the following advantages.

First, description will be given of the case in which a DC component of the circuit current flows through the solid electrolytic capacitor A1. As noted before, the resistance R3 of the bypass current path P is lower than the equivalent series resistance (which equals to the sum of the resistances R1a and R1b) of the porous sintered body 1 between the input and the output anode terminals 11a and 11b. Therefore, the DC component is likely to flow through the bypass current path P. Therefore, even when the circuit 7 includes a HDD and hence the DC component is high current, the current which flows through the porous sintered body 1 can be reduced. As a result, heating of the porous sintered body 1 can be suppressed. Particularly, the local temperature rise at the junction between each anode wire 10a and the porous sintered body 1 can be reliably prevented. It is to be noted that the structure is applicable to higher current as the resistance R3 is set lower. To reduce the resistance R3, the thickness of the metal cover 4 may be increased, for example.

Next, description will be given of the case in which an AC component of the circuit current flows through the solid electrolytic capacitor A1. As noted before, the inductance L3 of the bypass current path P is higher than the equivalent series inductance between the anode terminals 11a, 11b and the external cathode terminals 31a, 31b (which is equal to the sum of the inductance L1a or L1b and the inductance L2a or L2b). Therefore, the AC component is likely to flow through the porous sintered body 1 to the external cathode terminals 31a, 31b. For example, the AC component comprises noise included in the circuit current, and such noise can be effectively removed from the circuit current by the solid electrolytic capacitor A1. Further, part of the AC component which flows through the bypass current path P can be attenuated by the inductance L3, which is more effective when the frequency thereof is high.

Further, it is possible to reduce the resistance in supplying the electric energy stored in the solid electrolytic capacitor A1 to the circuit 7. Specifically, in a prior art solid electrolytic capacitor of the three terminal type or four terminal type, current flows only through the output anode terminal during the discharge for power supply. On the other hand, in the above-described first embodiment, power can be supplied to the circuit 7 not only from the output anode terminal 11b but also from the input anode terminal 11a through the metal cover 4 constituting the bypass current path P. That is, the power can be supplied in such a manner as if the equivalent series resistance R1b on the output side and the combined resistance of the equivalent series resistance R1a on the input side and the resistance R3 of the bypass current path P are connected in parallel. Therefore, the resistance in the route through which power is supplied from the solid electrolytic capacitor A1 can be reduced.

The metal cover 4 is arranged to cover the porous sintered body 1. The metal cover 4 has high mechanical strength and can prevent the solid electrolytic capacitor A1 from being deformed entirely even when the porous sintered body 1 heats up. Therefore, cracking of the sealing resin 51 is reliably prevented, so that the porous sintered body 1 is prevented from being exposed to the outside air. Further, the metal cover 4 is superior in heat conductivity to the sealing resin 51. Therefore, the heat from the porous sintered body 1 can be efficiently dissipated to the outside. Due to these factors, the tolerable power loss of the solid electrolytic capacitor A1 is increased, and high current can be allowed to flow through the capacitor A1.

In the above embodiment, the metal cover 4 which serves to protect the porous sintered body 1 and to dissipate heat also serves to provide the bypass current path P. Therefore, a particular part just for providing the bypass current path P is not required, which is advantageous for saving the space of an apparatus to which the solid electrolytic capacitor A1 is mounted and for preventing the deterioration of the efficiency of the mounting operation. In the process of designing and manufacturing the solid electrolytic capacitor A1, the electrical resistance and the inductance of the metal cover 4 and the porous sintered body 1 can be so set easily that a desired relationship can be established therebetween.

The metal cover 4 and the conductive resin 35 are insulated from each other by the resin film 52. If the metal cover 4 and the conductive resin 35 are insulated by applying insulating resin on the upper surface of the conductive resin 35 into the form of a thin film, a pinhole is likely to be formed in the applied insulating resin. Such a pinhole unfavorably provides electrical conduction between the metal cover 4 and the conductive resin 35, which may cause problems such as short-circuiting in the solid electrolytic capacitor A1. However, by using the resin film 52 as is in the above-embodiment, the formation of a pinhole can be prevented even when the film is thin, so that the metal cover 4 and the conductive resin 35 can be reliably insulated from each other.

The metal cover 4 is formed with a plurality of holes 4h. Therefore, the sealing resin 51 can easily enter the portions around the anode wires 10a, 10b by utilizing, among the holes 4h, those 4h positioned adjacent to longitudinally opposite ends of the metal cover 4, for example. Further, by applying an adhesive (not shown) for bonding the resin film 52 to the metal cover 4 so that the adhesive enters the holes 4h, a larger amount of adhesive can be applied as compared with the structure in which such holes are not formed. Furthermore, by changing the size and arrangement of the holes 4h, the resistance and inductance of the bypass current path P can be easily adjusted.

Both of the external cathode terminals 31a and 31b comprise part of the metal plate 31. Therefore, the resistance and inductance between these parts can be made low, which is advantageous for reducing the ESR and ESL on the cathode side of the solid electrolytic capacitor A1 having the four-terminal structure. Since the center portion 31c of the metal plate 31 is covered with the sealing resin 51, the unfavorable electrical conduction with the wiring pattern on the substrate to which the solid electrolytic capacitor A1 is mounted can be avoided.

In the above-described embodiment, the capacitor is so designed that the "bypass inductance" becomes higher than the "equivalent series inductance". However, the present invention is not limited thereto, and the "bypass inductance" may be set lower than the "equivalent series inductance". In such a case, high speed response can be realized when the solid electrolytic capacitor A1 is used in a power circuit.

Figure 4:
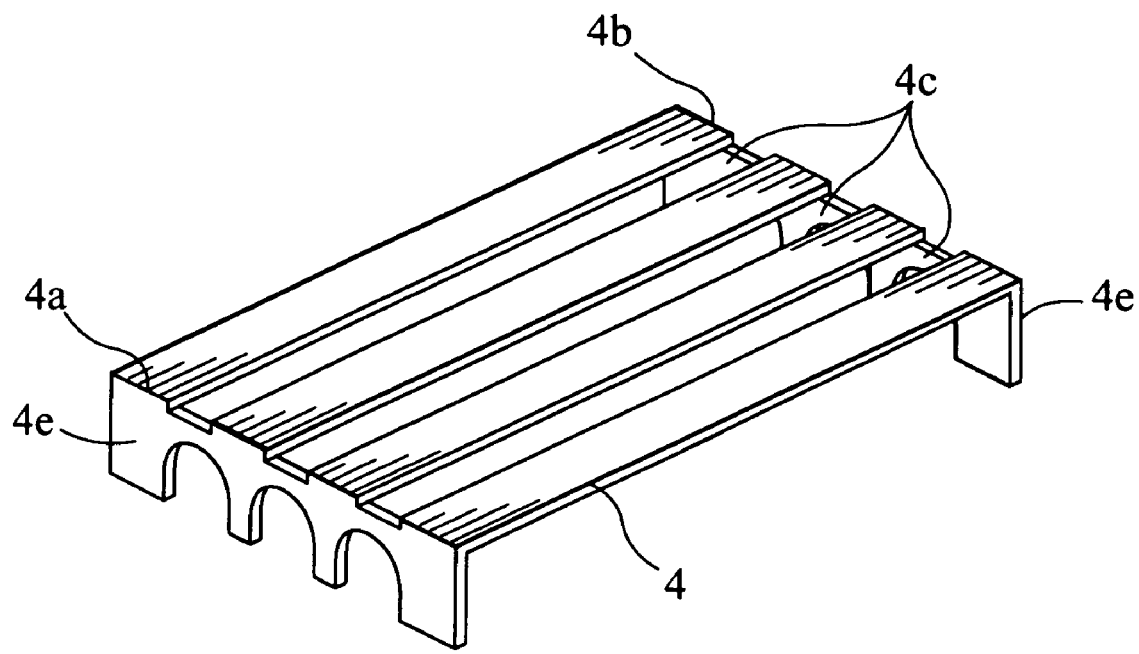
FIG. 4 is a perspective view showing an example of metal cover used in the solid electrolytic capacitor of FIG. 1.
Figure 5:
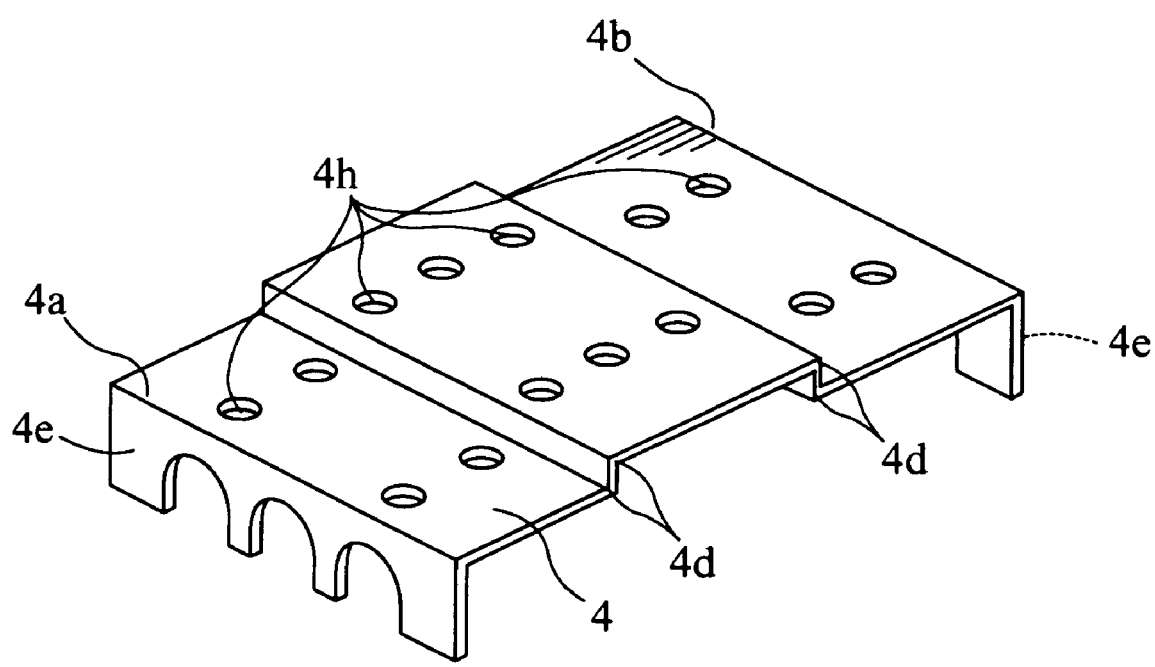
FIG. 5 is a perspective view showing another example of metal cover used in the solid electrolytic capacitor of FIG. 1.
Figure 6:
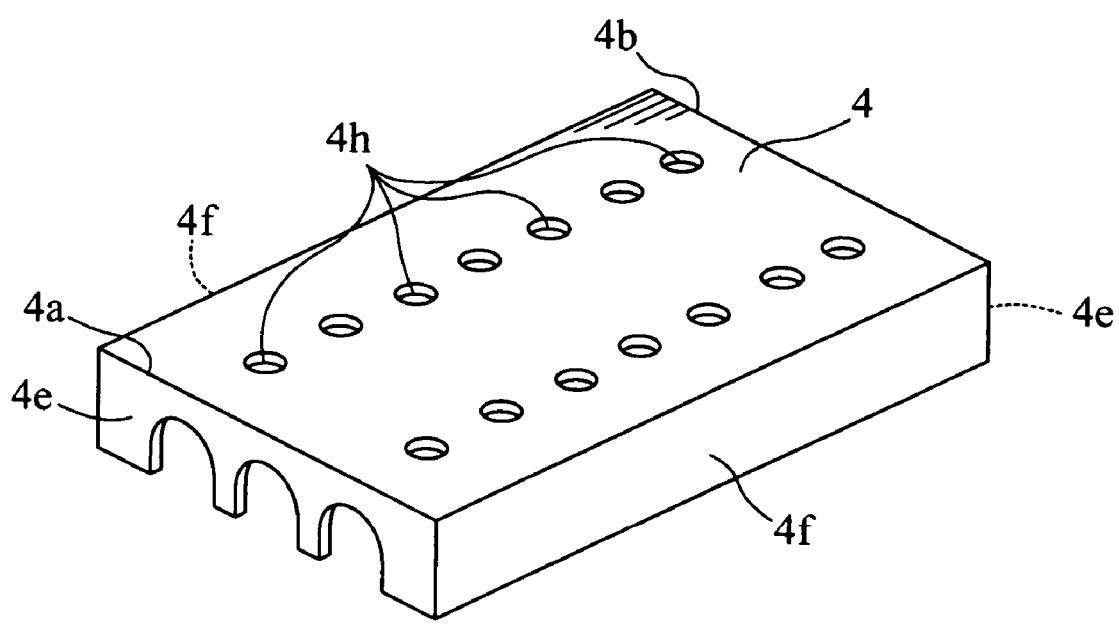
FIG. 6 is a perspective view showing still another example of metal cover used in the solid electrolytic capacitor of FIG. 1.

FIGS. 4–6 show examples of metal cover used in a solid electrolytic capacitor of the present invention. The metal cover 4 shown in FIG. 4 is formed with three slits 4c extending in the longitudinal direction. With such a structure, the circuit current is split by the slits 4c and flows in parallel through the metal cover 4, so that the inductance of the metal cover 4 with respect to alternating current can be increased. Therefore, an AC component such as noise contained in the circuit current is more likely to flow through the porous sintered body 1, which is advantageous for enhancing the noise cancellation characteristics of the capacitor. By changing the configuration, size and number of the slits 4c, the inductance of the metal cover 4 can be easily adjusted. Further, by forming the slits 4c, the electrical resistance of the metal cover 4 can be adjusted as well. Further, in forming a solid electrolytic capacitor provided with such a metal cover 4, sealing resin can be easily introduced into a space between the metal cover 4 and the porous sintered body 1 by utilizing the slits 4c.

The metal cover 4 shown in FIG. 5 is formed with four bent portions 4d in addition to the two bent portions 4a and 4b provided at opposite ends of the cover. With such a structure, the current path is bent about 90° at each of the bent portions 4d. Particularly when alternating current of a high frequency range flows, such bent portions 4d act like a coil, so that the inductance of the metal cover 4 can be increased. Therefore, such a structure is suitable for removing noise of a high frequency range bypassing the noise through the porous sintered body 1.

The metal cover 4 is not limited to the illustrated configurations and may have other configurations as long as it can provide the bypass current path while covering at least part of the porous sintered body 1 to protect the porous sintered body. For example, as shown in FIG. 6, the metal cover 4 may be in the form of a box including side plate portions 4f. In such a case, the cover 4 can cover the porous sintered body 1 from four sides, which is preferable for protecting the porous sintered body 1.

Figure 7:
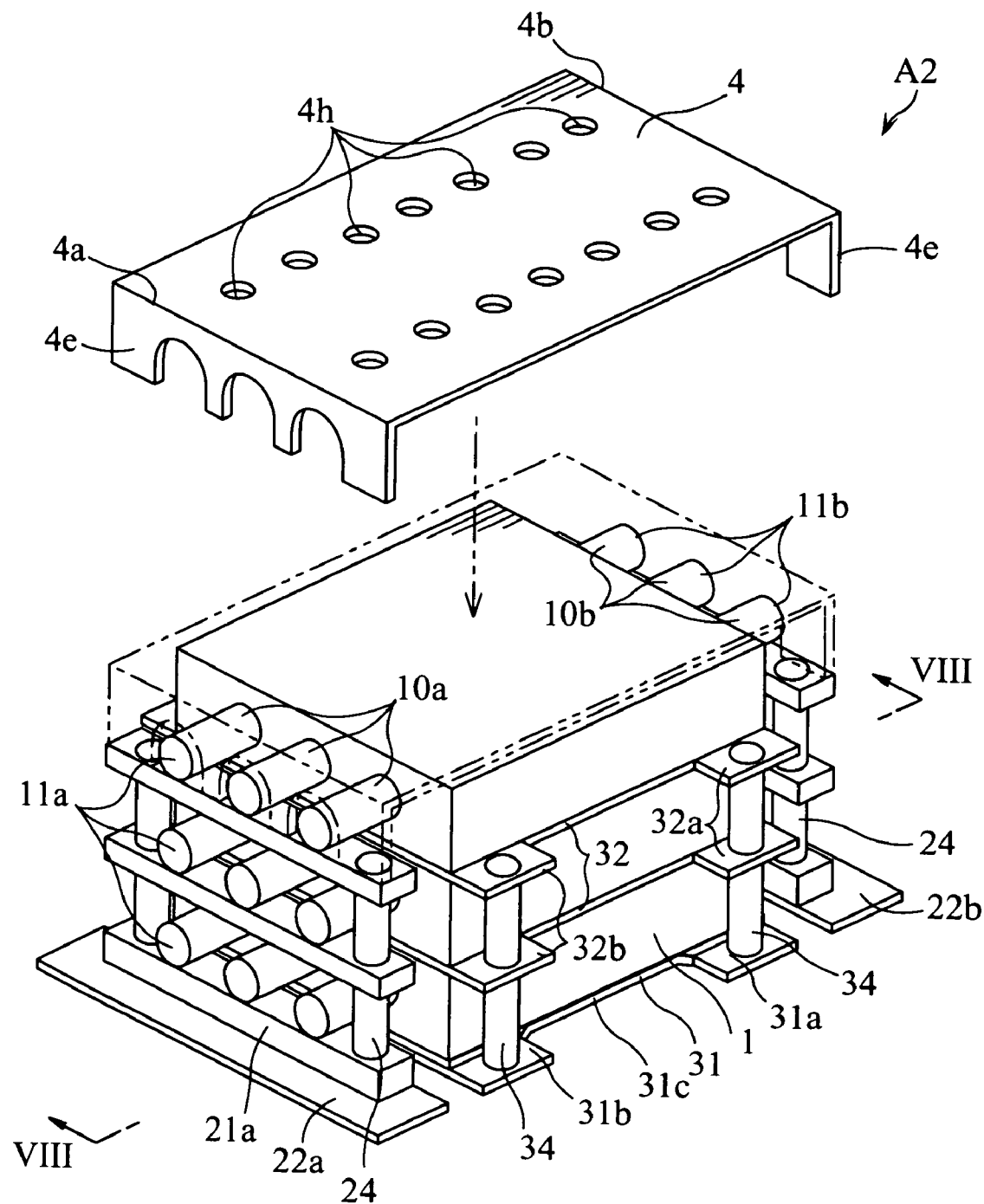
FIG. 7 is a perspective view showing a solid electrolytic capacitor according to a second embodiment of the present invention.
Figure 8:
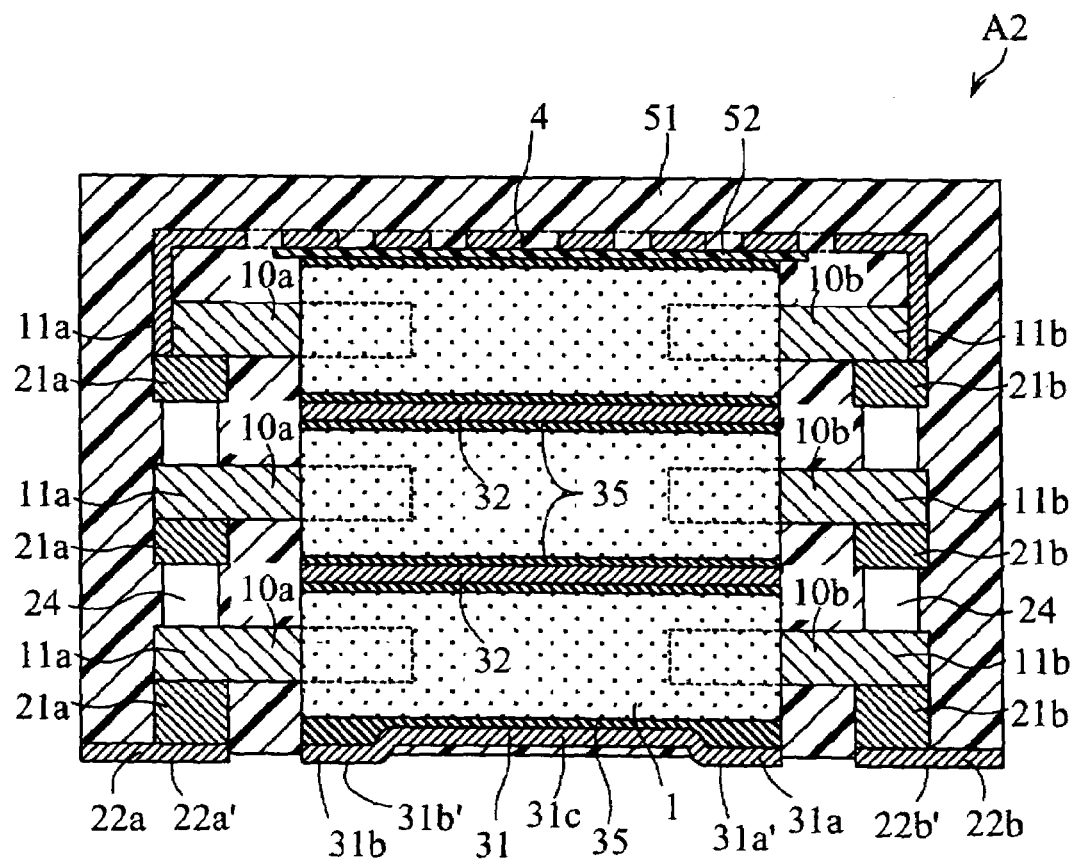
FIG. 8 is a sectional view taken along lines VIII—VIII in FIG. 7.

FIGS. 7 and 8 show a solid electrolytic capacitor A2 according to a second embodiment of the present invention. As will be understood from the figures, the capacitor A2 includes three porous sintered bodies 1 stacked together. Two adjacent ones of the porous sintered bodies 1 are bonded together by conductive resin 35 via a flat metal plate 32. The cathode terminals 32a, 32b of each metal plate 32 and external cathode terminals 31a, 31b are formed with holes in which a plurality of connection members 36 are provided to penetrate threrethrough. As a result, the metal plate 31 and the two metal plates 32 are electrically connected to the solid electrolytic layers formed on the porous sintered bodies 1 and also electrically connected to each other. Similarly, three conductive members 21a, 21b are formed with holes, and a plurality of connection members 24 are provided to penetrate therethrough to electrically connect these members to each other. The connection members 24 and 36 are made of a metal having high conductivity such as copper. A metal cover 4 is so arranged as to cover the uppermost porous sintered body 1 and is electrically connected to the uppermost conductive members 21a and 21b. Thus, the three porous sintered bodies 1 and the metal cover 4 are electrically connected in parallel.

With the above-described structure, the provision of the three porous sintered bodies 1 increases the capacitance of the capacitor A2. Since each of the porous sintered bodies 1 is relatively thin, the current path between the metal plate 31 or each metal plate 32 and each of the anode wires 10a, 10b can be made relatively short. Therefore, the ESR and the ESL can be reduced. Since the three porous sintered bodies 1 are stacked together, the space for mounting the capacitor A2 is generally equal to the space for mounting a capacitor including a single porous sintered body 1. Further, the connection members 24, 36 provide electrical connection between the three conductive members 21a, between the three conductive members 21b and between the metal plates 31, 32. Therefore, the resistance between each porous sintered body 1 and the external anode terminals 22a, 22b or the external cathode terminals 31a, 31b can be reduced, so that the heat generation can be suppressed when current passes through each porous sintered body 1.

Figure 9:
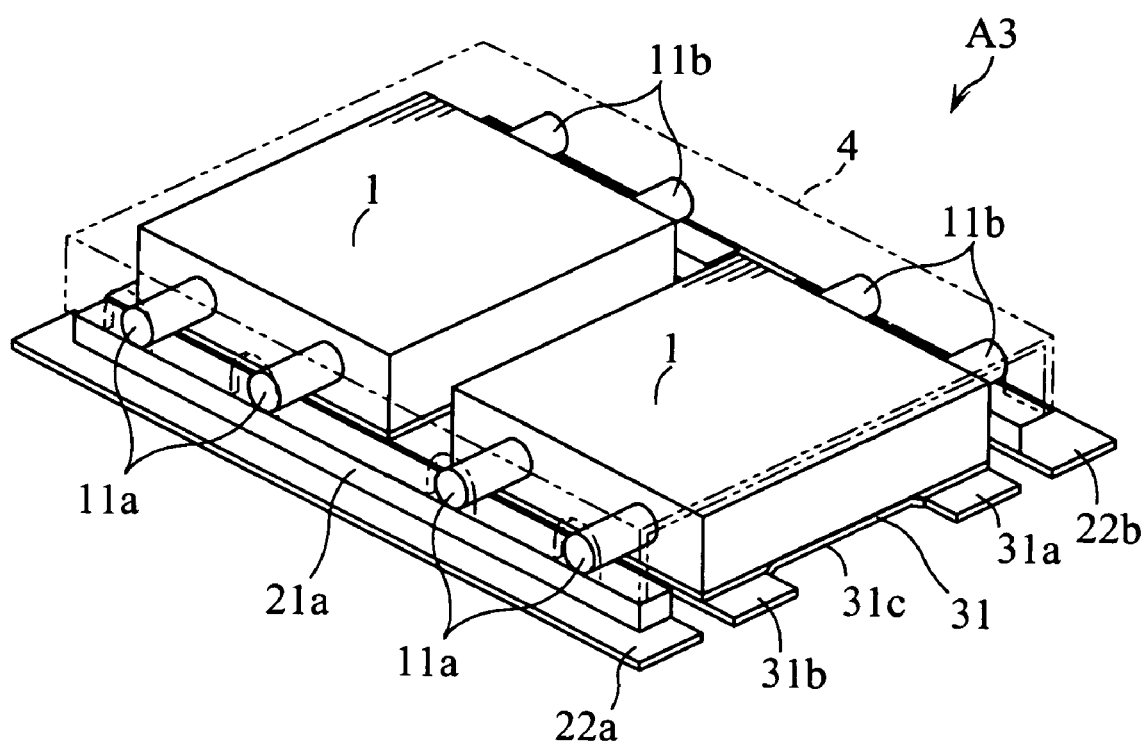
FIG. 9 is a perspective view showing a solid electrolytic capacitor according to a third embodiment of the present invention.

FIG. 9 shows a solid electrolytic capacitor A3 according to a third embodiment of the present invention. The capacitor A3 includes two porous sintered bodies 1 arranged in parallel. Each of the porous sintered bodies 1 includes two anode wires for inputting and two anode wires for outputting, whereby including two input anode terminals 11a and two output anode terminals 11b. The anode terminals 11a and 11b are electrically connected to an external anode terminal 22a for inputting and an external anode terminal 22b for outputting, respectively. Both of the solid electrolytic layers (not shown) formed at the two porous sintered bodies 1 are electrically connected to a metal plate 31. The metal cover 4 has a size capable of housing the two porous sintered bodies.

With such a structure again, similarly to the structure shown in FIGS. 7 and 8, the capacitance of the capacitor can be increased. The input anode terminals 11a and the output anode terminals 11b are arranged close to the external anode terminals 22a and 22b, respectively. Therefore, when the capacitor A3 is mounted on a substrate, the distance between the anode terminals 11a, 11b and the substrate is relatively short. Accordingly, the path of current flowing between the anode terminals 11a, 11b and the wiring pattern formed on the substrate is relatively short. With such a structure, the impedance with respect to alternating current in a frequency range higher than the self resonant point of the capacitor A3 can be reduced, which is advantageous for further reducing the ESL of the capacitor A3. The two porous sintered bodies are aligned in a direction crossing the direction in which the input and the output anode terminals 11a and 11b extend. Therefore, even when a plurality of porous sintered bodies 1 are provided, the distance between the input and the output anode terminals 11a and 11b does not increase, which is suitable for reducing the ESR and the ESL. It is to be noted that three or more porous sintered bodies 1 may be provided. The porous sintered bodies 1 may be individually covered by respective covers.

Figure 10:
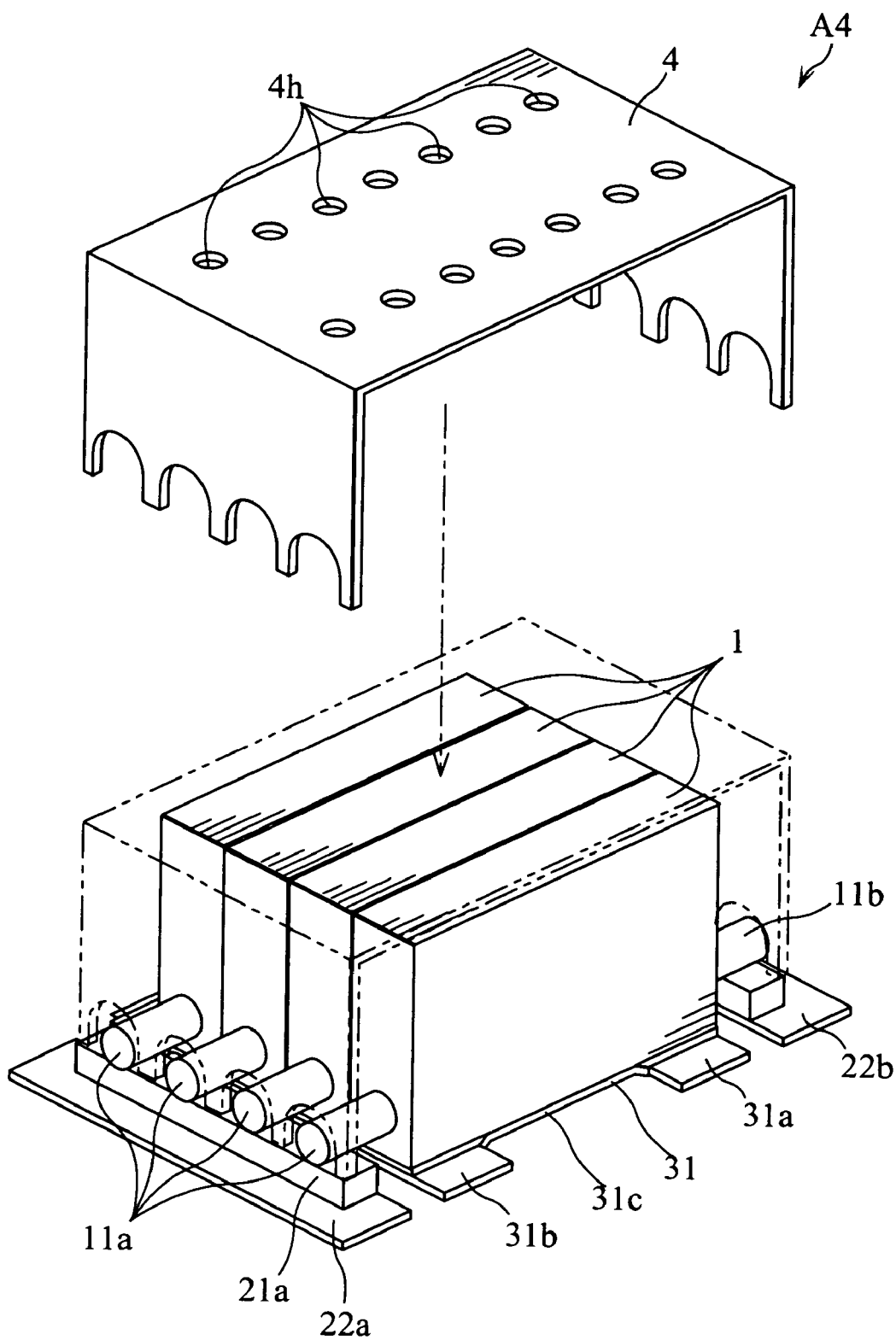
FIG. 10 is a perspective view showing a solid electrolytic capacitor according to a fourth embodiment of the present invention.

FIG. 10 shows a solid electrolytic capacitor A4 according to a fourth embodiment of the present invention. The capacitor A4 includes four porous sintered bodies 1. Each of the porous sintered bodies 1 is provided with a single anode wire 10a for inputting and a single anode wire 10b for outputting, whereby including a single input anode terminal 11a and a single output anode terminal 11b. The anode terminals 11a and 11b are provided at a position lower than the center of each porous sintered body 1 in the height direction. The metal cover 4 has a configuration capable of collectively covering the four porous sintered bodies 1.

With such a structure again, similarly to the structure shown in FIGS. 7 and 8, the capacitance can be increased without considerably increasing the mounting space. Further, similarly to the structure shown in FIG. 9, the impedance in a frequency range higher than the self resonant point of the capacitor can be reduced, which is advantageous for reducing the ESL.

Figure 11:
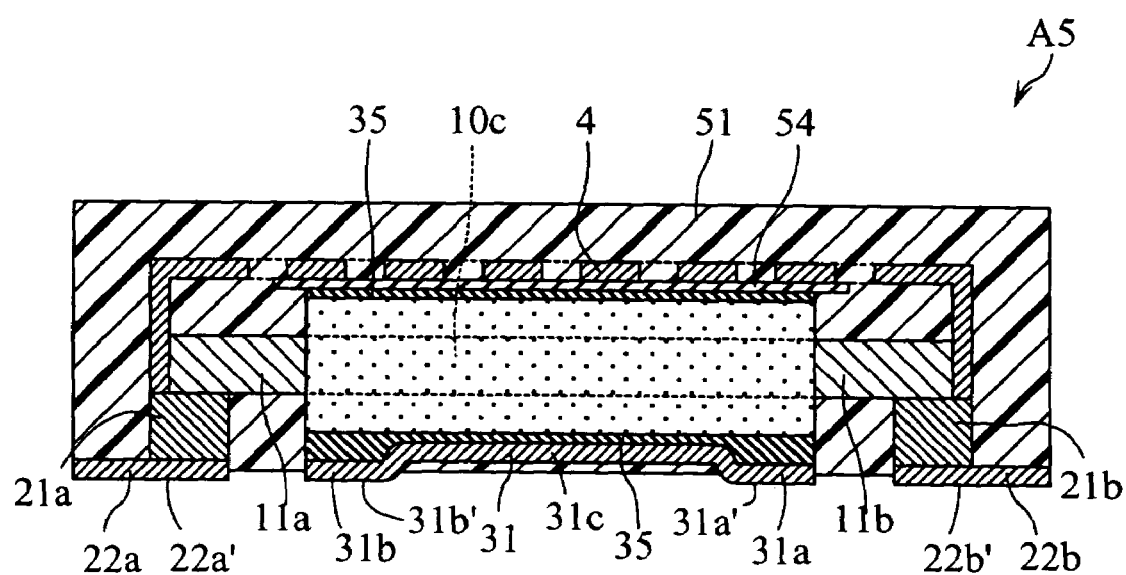
FIG. 11 is a sectional view showing a solid electrolytic capacitor according to a fifth embodiment of the present invention.

FIG. 11 shows a solid electrolytic capacitor A5 according to a fifth embodiment of the present invention. The capacitor A5 includes an anode wire 10c penetrating through the porous sintered body 1. Opposite ends of the anode wire 10c which project from the porous sintered body 1 serve as an input and an output anode terminals 11a and 11b. With such an arrangement, the circuit current as direct current flows from the input anode terminal 11a toward the output anode terminal 11b through the anode wire 10c and hardly flows into the porous sintered body 1. The anode wire 10c is solid and its electrical resistance is lower than that of the porous sintered body 1 in which a plurality of minute pores are formed. Therefore, the electrical resistance between the anode terminals 11a and 11b is lower than in the case where the anode wire does not penetrate through the porous sintered body, whereby the ESR can be reduced. Between the metal case 4 and the conductive resin 35 intervenes a plate 54 made of a ceramic material for providing insulation between these parts. Since the mechanical strength of the ceramic plate 54 is higher than that of e.g. a resin film, the possibility of a defect such as a pinhole is further reduced. Moreover, since a ceramic material has higher heat resistance as compared with resin, the change in quality, for example, can be suppressed even when heated to a high temperature in the manufacturing process of the solid electrolytic capacitor A5.

Figure 12:
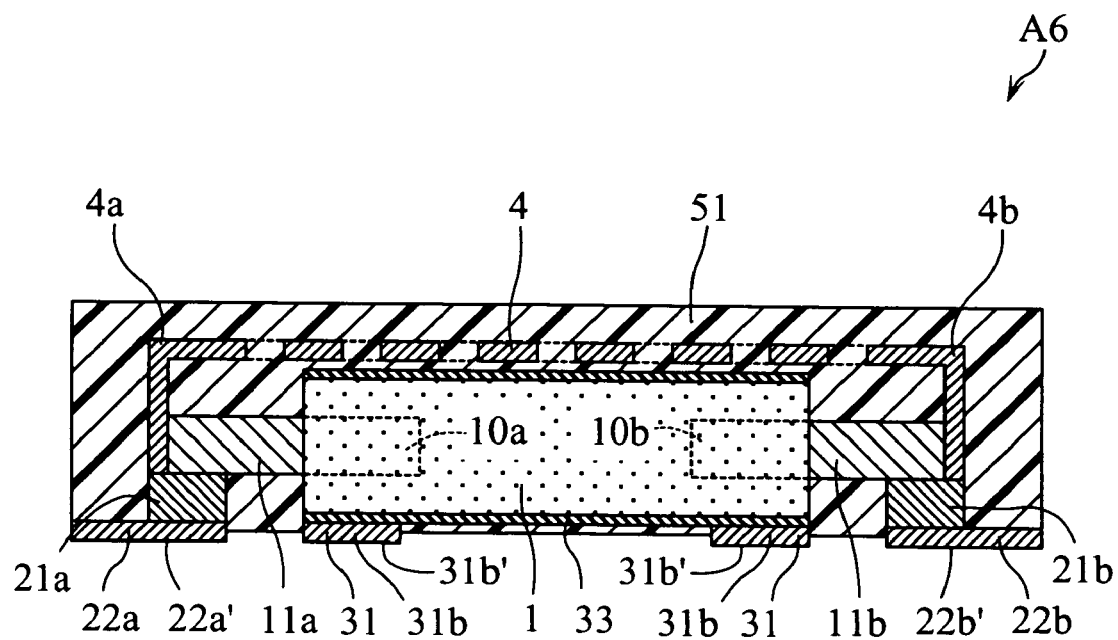
FIG. 12 is a sectional view showing a solid electrolytic capacitor according to a sixth embodiment of the present invention.
Figure 13:
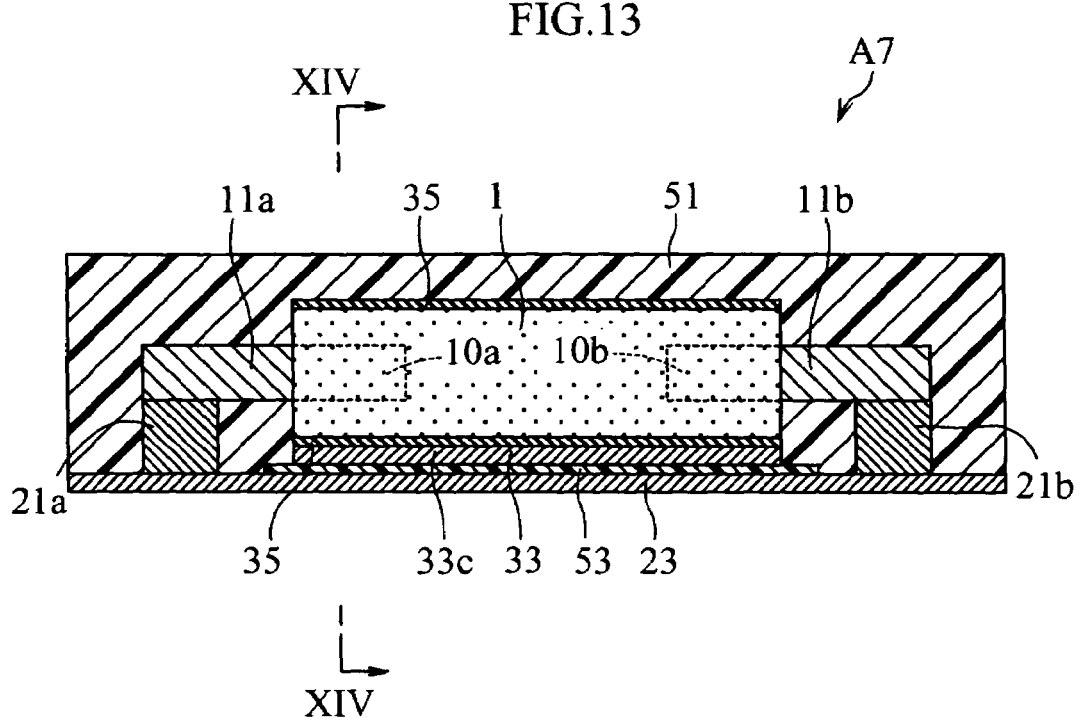
FIG. 13 is a sectional view showing a solid electrolytic capacitor according to a seventh embodiment of the present invention.
Figure 14:
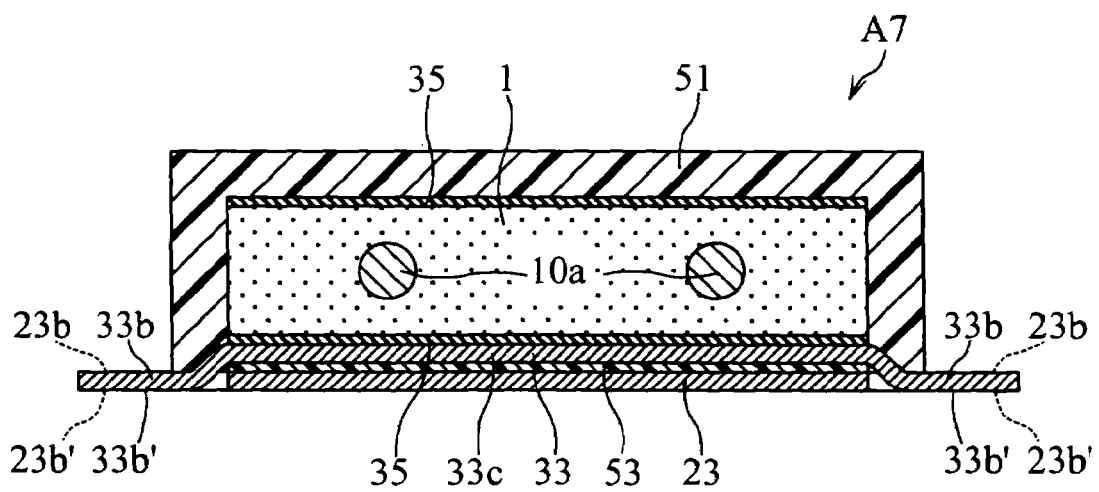
FIG. 14 is a sectional view taken along lines XIV—XIV in FIG. 13.
Figure 15:
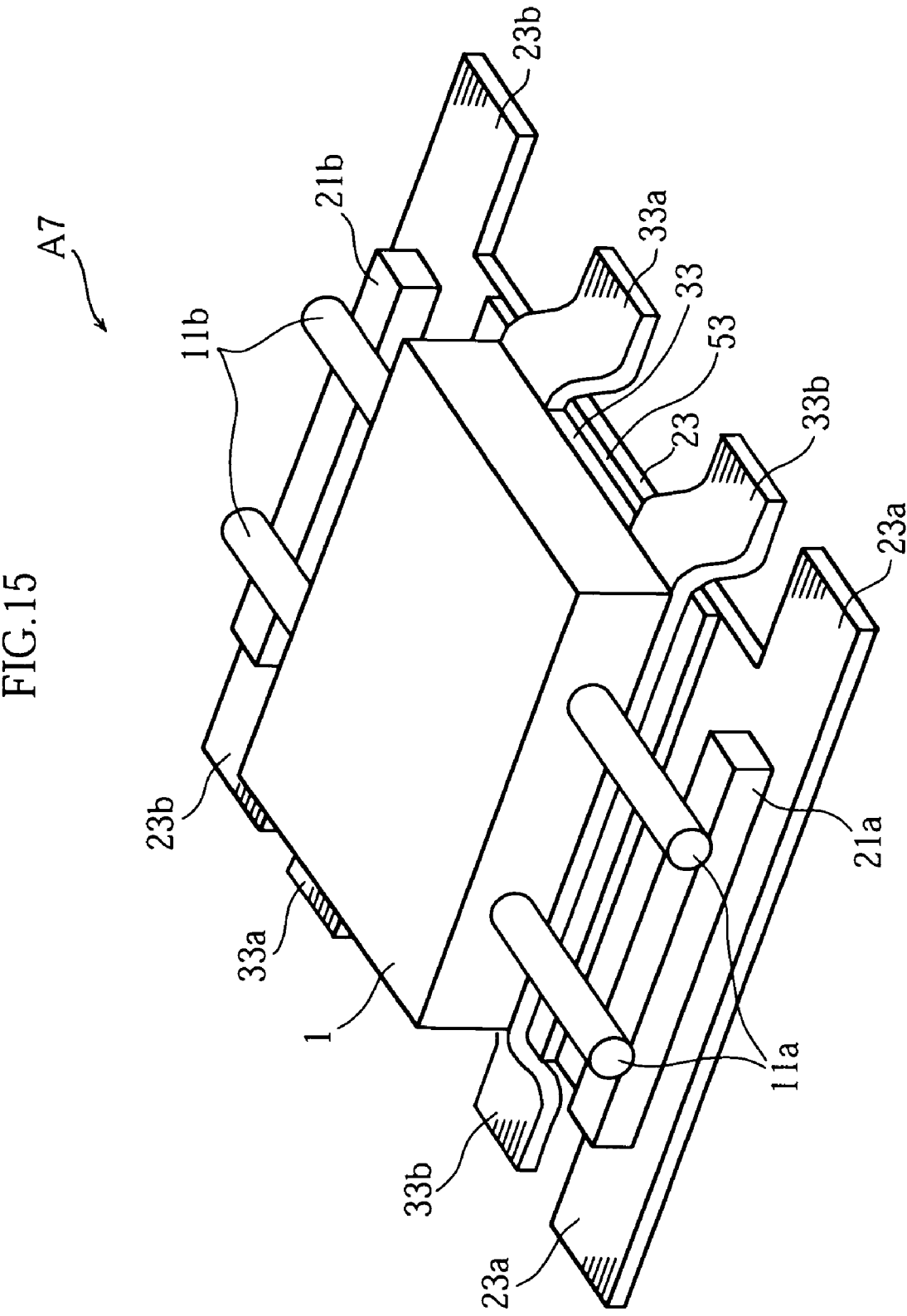
FIG. 15 is a perspective view showing a solid electrolytic capacitor according to a seventh embodiment.
Figure 16:
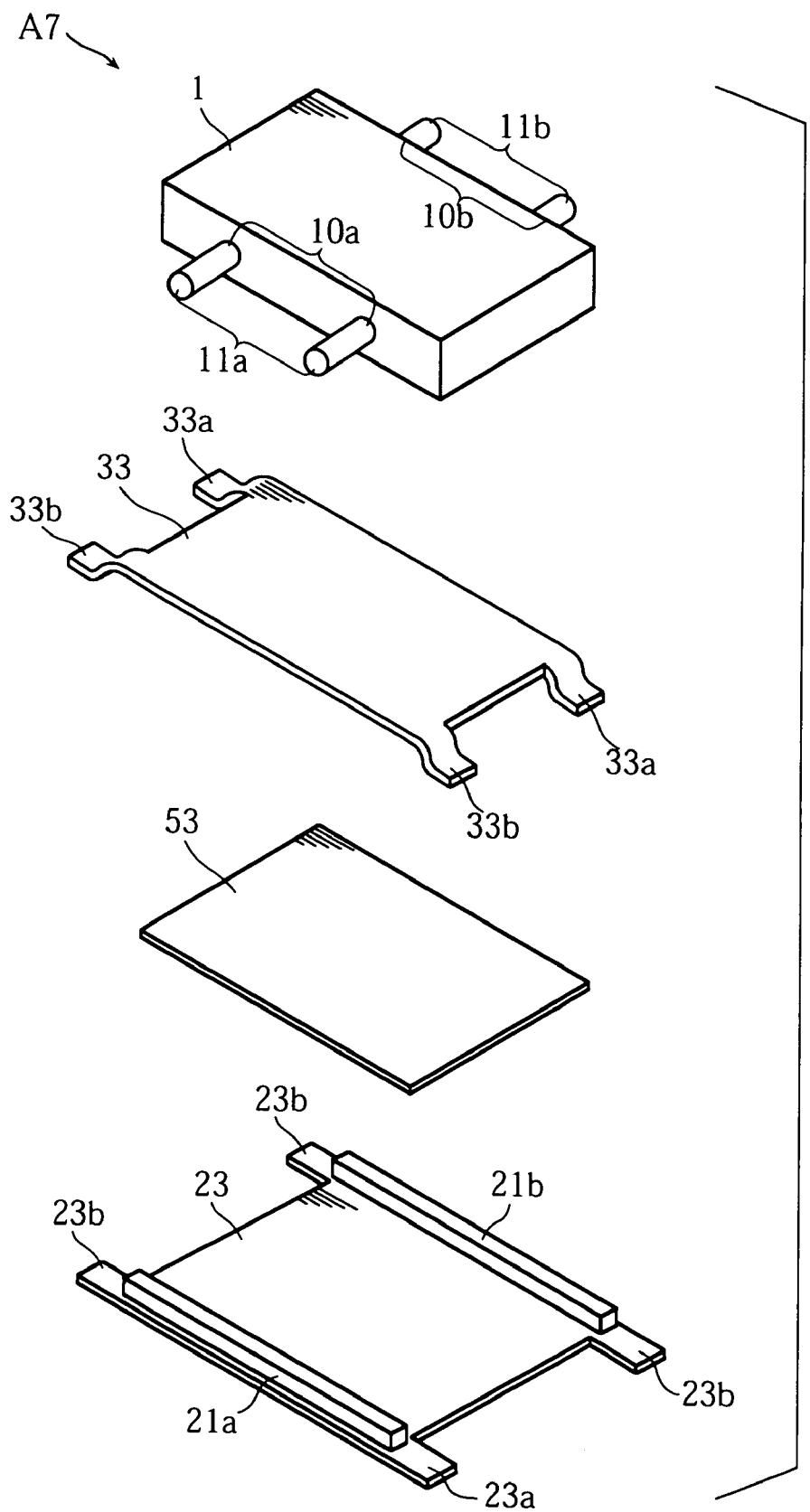
FIG. 16 is an exploded view showing the solid electrolytic capacitor of the seventh embodiment.

FIG. 12 shows a solid electrolytic capacitor A6 according to a sixth embodiment of the present invention. In the capacitor A6, unlike the foregoing embodiments, external cathode terminals 31a, 31b are provided by two metal plates 31. With such a structure again, a solid electrolytic capacitor of the four terminal type can be provided. The high frequency characteristics of the solid electrolytic capacitor A6 can be adjusted by changing e.g. the size and arrangement of the two metal plates 31. In this embodiment, part of the sealing resin 51 enters between the metal cover 4 and the conductive resin 35. With such a structure, the metal cover 4 and the conductive resin 35 can be insulated from each other without using an additional resin film.

FIGS. 13–16 show a solid electrolytic capacitor A7 according to a seventh embodiment of the present invention. The capacitor A7 differs from those of the foregoing embodiments in that the bypass current path comprises an anode conductor plate 23. It is to be noted that sealing resin 51 is omitted in FIGS. 15 and 16.

The solid electrolytic capacitor A7 includes a cathode conductor plate 33, an anode conductor plate 23 and a resin film 53. The cathode conductor plate 33 includes a main plate portion 33c bonded to the bottom surface of the porous sintered body 1 via conductive resin 35, and hence, is electrically connected to the solid electrolytic layer (not shown) formed on the porous sintered body 1. The cathode conductor plate 33 includes four extensions extending out from the main plate portion 33c. The extensions serve as two external cathode terminals 33a for inputting and two external cathode terminals 33b for outputting.

The resin film 53 is provided on the lower surface of the main plate portion 33c. The anode conductor plate 23 is stacked via the insulating resin film 53 (e.g. Kapton (registered trademark) available from DuPont). Conductive members 21a, 21b are bonded adjacent opposite ends of the anode conductor plate 23 to electrically connect the anode conductor plate to the input and the output anode terminals 11a, 11b. With such a structure, a bypass current path is formed between the anode terminals 11a and 11b through the anode conductor plate 23. Since the anode conductor plate 23 is flat, its inductance is lower than the inductance between the anode terminals 11a, 11b and the external cathode terminals 33a, 33b, for example. The anode conductor plate 23 includes four extensions which serve as two external anode terminals 23a for inputting and two external anode terminals 23b for outputting. The main plate portion 33c of the cathode conductor plate 33 and the input and the output external cathode terminals 33a, 33b differ from each other in height, whereas the bottom surfaces of the four external anode terminals 23a, 23b and the bottom surfaces of the four external cathode terminals 33a, 33b are generally flush with each other. The anode conductor plate 23 and the cathode conductor plate 33 may be made of Cu alloy or Ni alloy, for example.

The capacitor having the above structure can be made by assembling the anode conductor plate 23, the resin film 53, the cathode conductor plate 33 and the conductive members 21a, 21b into an integral unit in advance, and then bonding the porous sintered body 1 formed thereafter to the integral unit. Such a manufacturing method is simpler and leads to the enhancement of productivity as compared with a method in which a porous sintered body 1 is formed and then a plurality of members for providing external anode terminals and external cathode terminals are successively bonded to the porous sintered body, for example.

Since the anode conductor plate 23 and the cathode conductor plate 23 are stacked together via the resin film 53, these plates are reliably insulated from each other. Since both of the anode conductor plate 23 and the cathode conductor plate 33 are generally flat and the resin film 53 is a thin film, the height of the solid electrolytic capacitor A7 obtained by stacking these members together can be made small.

When the solid electrolytic capacitor A7 is used in place of the solid electrolytic capacitor A1 in the circuit shown in FIG. 3, high speed response can be realized in supplying electric energy stored in the capacitor to the circuit 7. Specifically, power can be supplied to the circuit 7 not only through the output anode terminals 11b but also through the input anode terminals 11a and the anode conductor plate 23 providing the bypass current path P. Since the anode conductor plate 23 is flat and does not include a stepped portion, the inductance L3 of the bypass current path P can be made low. Therefore, the electric energy stored in the solid electrolytic capacitor can be discharged with a sharp rise, whereby high speed response can be realized. Since the inductance L3 is low, noise generated from the circuit 7 can be caused to flow into the solid electrolytic capacitor A7 not only from the output anode terminals 11b but also from the input anode terminals 11a through the bypass current path P. Therefore, the ESR and the ESL can be advantageously reduced, whereby the high frequency characteristics can be enhanced. Although a single porous sintered body is used in the illustrated example, a plurality of porous sintered bodies may be used as stacked together. In such a case, the high speed response in power supply can be realized while increasing the capacitance.

Figure 17:
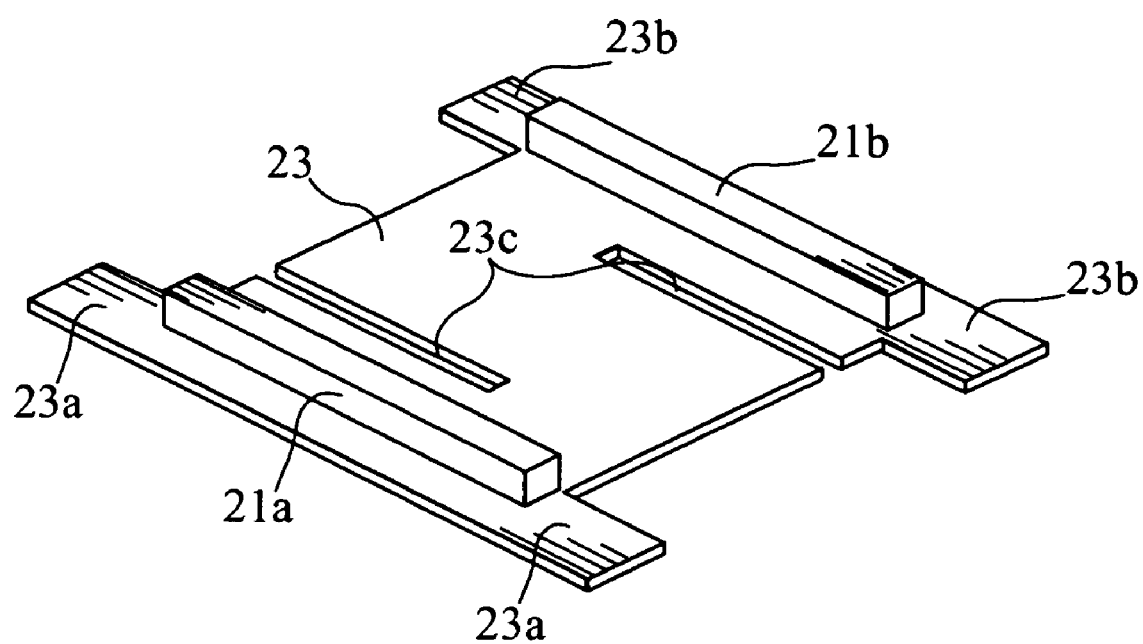
FIG. 17 is a perspective view showing an example of anode conductor plate used in a solid electrolytic capacitor of the present invention.

FIG. 17 shows another example of anode conductor plate used for a solid electrolytic capacitor of the present invention. The illustrated anode conductor plate 23 includes two slits 23c at a portion constituting a bypass current path. Each of the slits 23c extends from one end toward the other end of the anode conductor plate 23. With such a structure, the inductance of the bypass current path can be made high. Further, by appropriately setting the length and width of each slit 23c, the inductance of the bypass current path can be adjusted.

Figure 18:
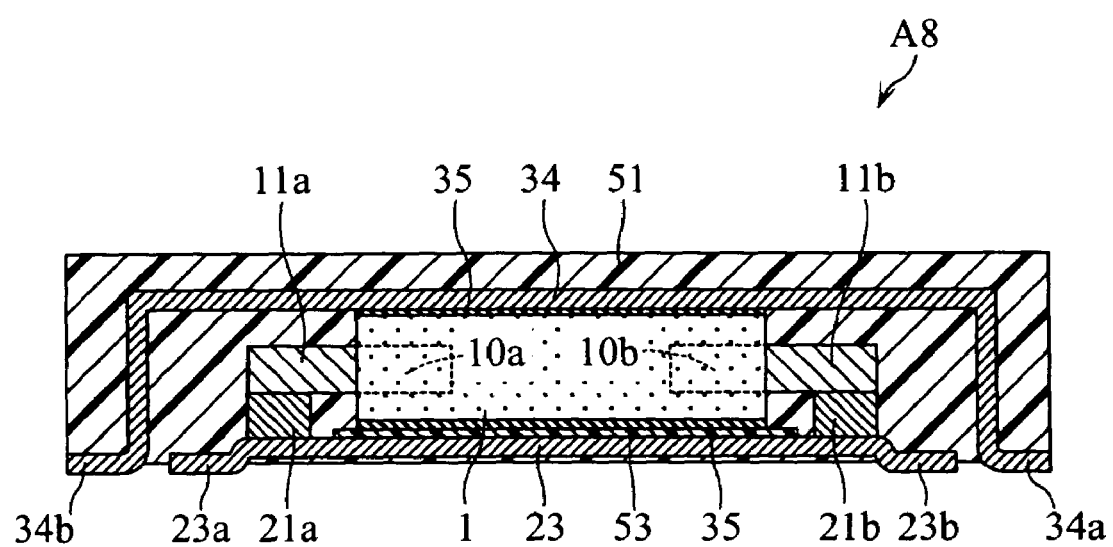
FIG. 18 is a sectional view showing a solid electrolytic capacitor according to an eighth embodiment of the present invention.
Figure 19:
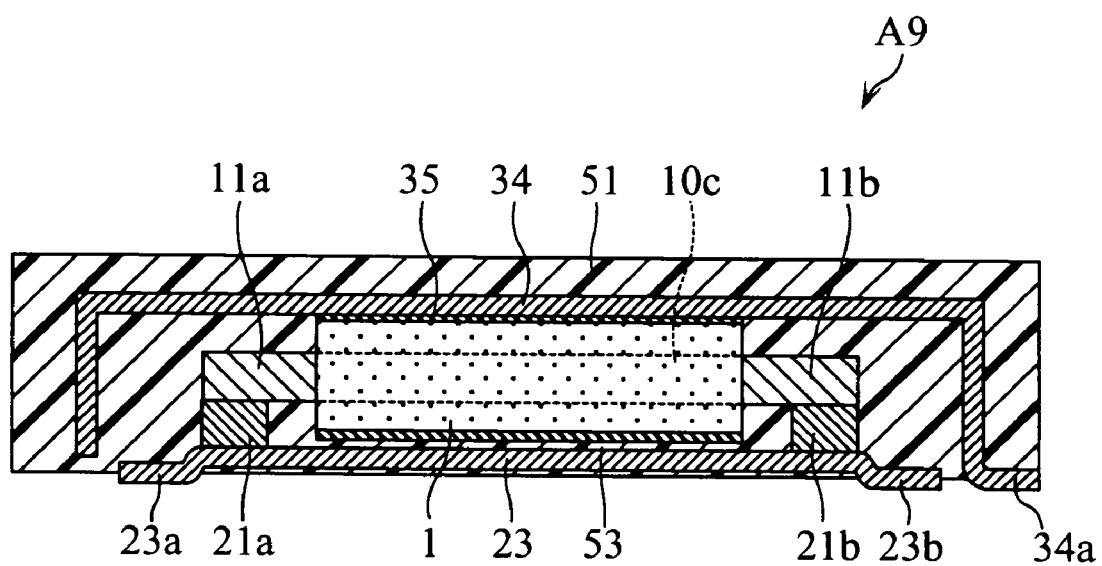
FIG. 19 is a sectional view showing a solid electrolytic capacitor according to a ninth embodiment of the present invention.

FIG. 18 shows a solid electrolytic capacitor A8 according to an eighth embodiment of the present invention. The capacitor A8 includes a metal cover 34 electrically connected to a solid electrolytic layer (not shown) formed on the porous sintered body 1. The metal cover 34 has opposite ends which are bent and partially exposed at the bottom surface side of the solid electrolytic capacitor A8. The exposed portions serve as input and output external cathode terminals 34a, 34b. An anode conductor plate 23 is stacked to the bottom surface of the porous sintered body 1 via a resin tape 53. With such a structure again, the inductance of the bypass current path provided by the anode conductor plate 23 can be made low. Even with such a structure in which the metal cover 34 capable of housing at least part of the porous sintered body 1 is used as a cathode-side structural member, the high frequency characteristics can be enhanced and the solid electrolytic capacitor A8 can be reliably protected. Although FIG. 18 shows a structure of the four terminal type, the invention is not limited thereto. For example, as shown in FIG. 19, the structure of the three terminal type may be employed (ninth embodiment of the present invention).

Figure 20:
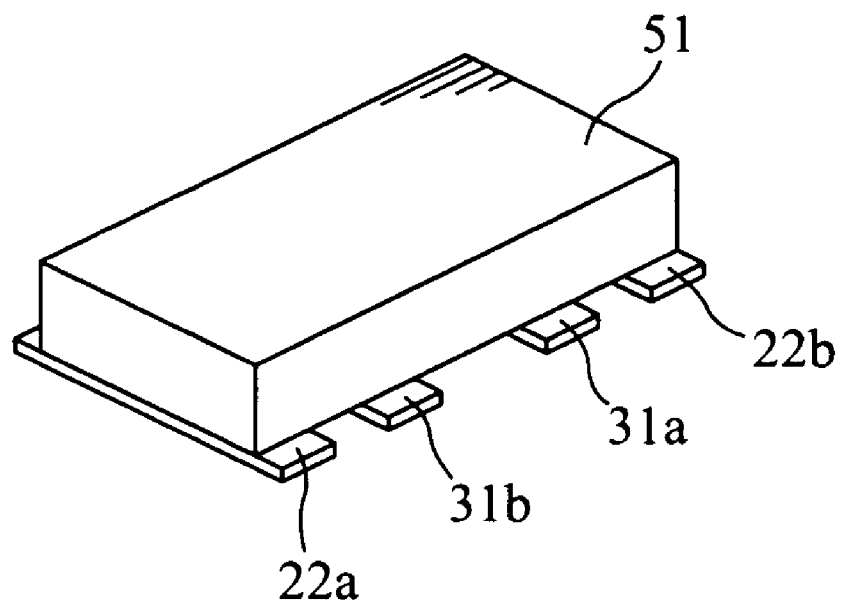
FIG. 20 is a perspective view showing an example of solid electrolytic capacitor according to the present invention.
Figure 21:
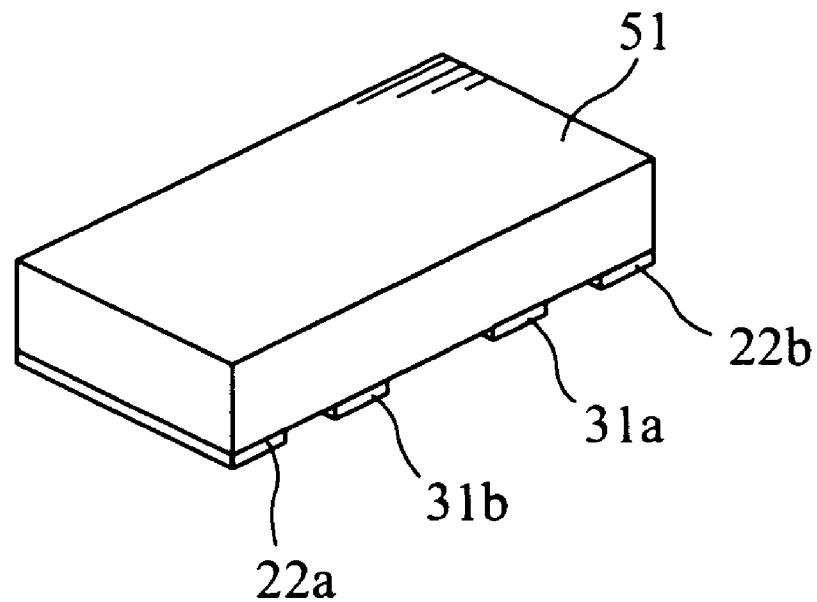
FIG. 21 is a perspective view showing a variation of the solid electrolytic capacitor of FIG. 20.

In the solid electrolytic capacitor shown in FIG. 20, external anode terminals 22a, 22b and external cathode terminals 31a, 31b project laterally. With such a structure, large areas of the external anode terminals 22a, 22b and the external cathode terminals 31a, 31b can be utilized for surface mounting, which is advantageous for reducing the resistance. On the other hand, in the solid electrolytic capacitor shown in FIG. 21, external anode terminals 22a, 22b and external cathode terminals 31a, 31b do not project laterally beyond a side surface of the sealing resin 51. With such a structure, the space required for mounting the solid electrolytic capacitor can be reduced.

Figure 22:
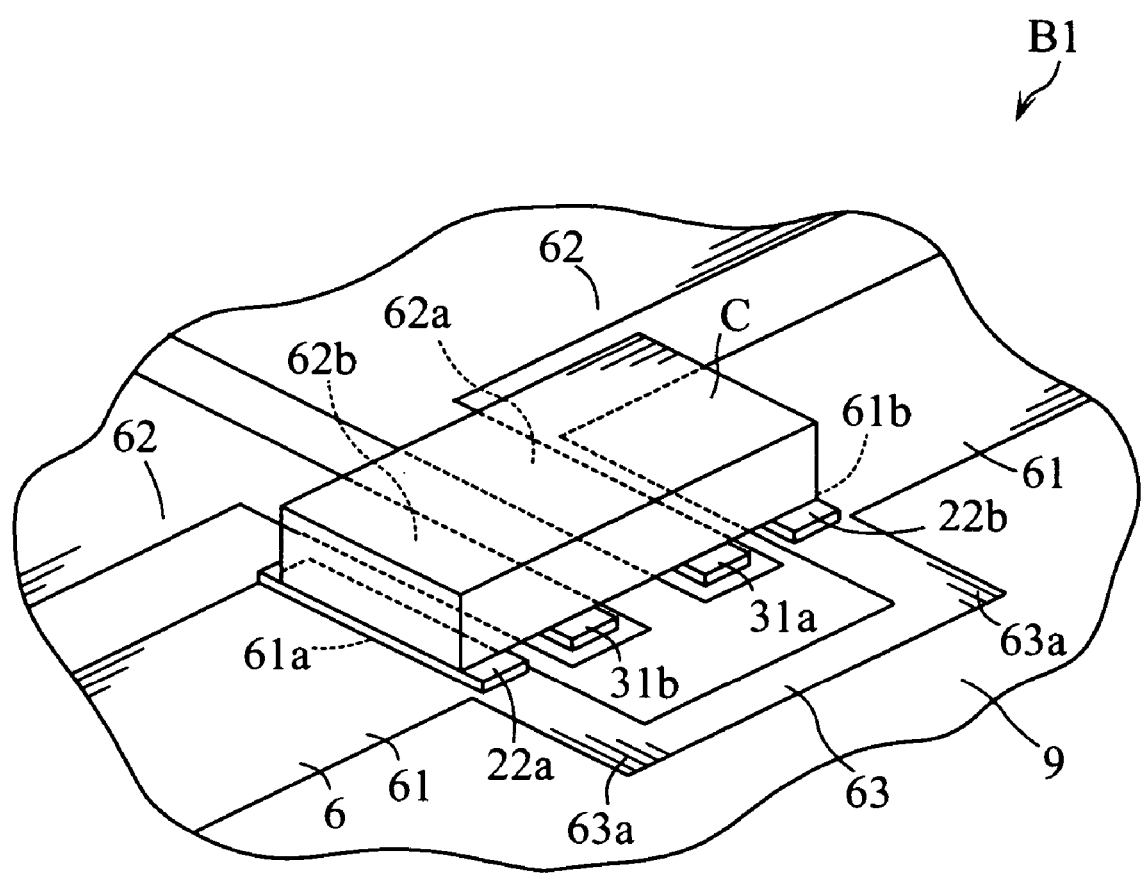
FIG. 22 is a perspective view showing a principal portion of an example of electric circuit according to the present invention.
Figure 23:
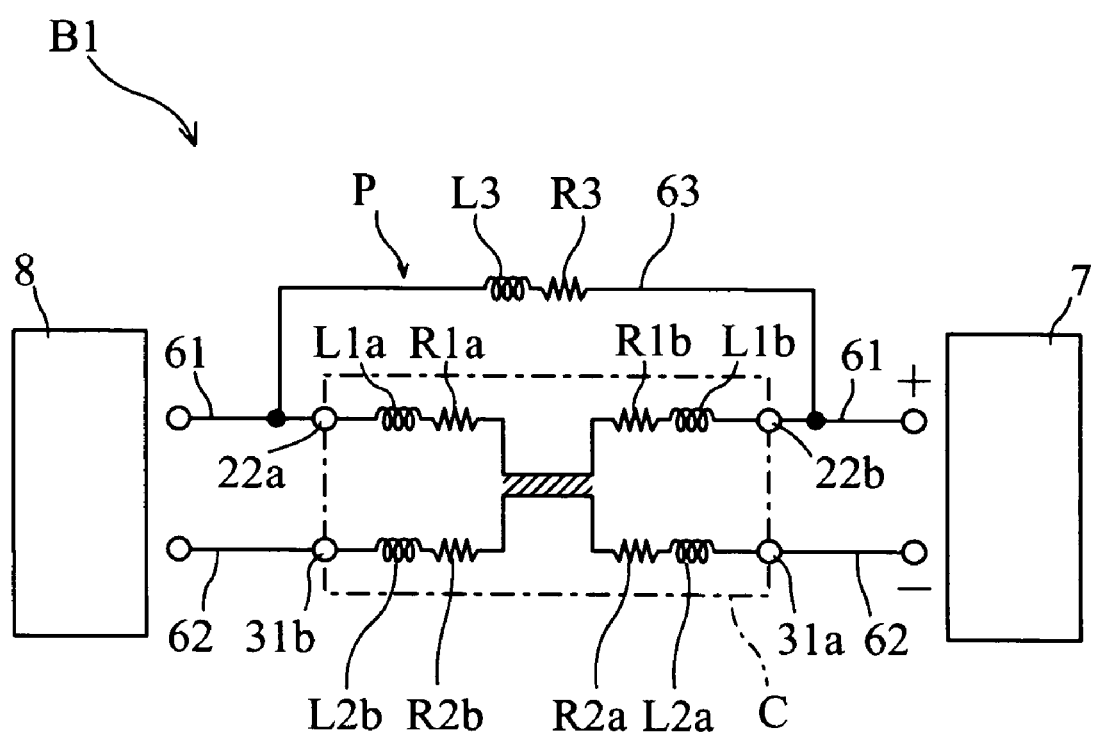
FIG. 23 is a circuit diagram showing the entire structure of the circuit of FIG. 22.

FIGS. 22 and 23 show an example of electric circuit according to the present invention. In the illustrated electric circuit B1, a capacitor C is used. The capacitor C is a solid electrolytic capacitor of the four terminal type, which includes a cathode provided with a solid electrolytic layer, an anode body provided on the cathode via a dielectric layer, an input and an output external anode terminals 22a, 22b for allowing circuit current to flow through the anode body, and an input and an output external cathode terminals 31a, 31b electrically connected to the solid electrolytic layer. The capacitor C has a structure similar to those of the solid electrolytic capacitors A1–A6 from which the metal cover is removed. The capacitor C is mounted on a substrate 9. The substrate 9 is formed with a wiring pattern 6 made of copper, for example. The wiring pattern 6 includes a route 61 for flowing circuit current of the anode side and a route 62 for flowing circuit current of the cathode side. Both of the routes 61 and 62 have a relatively large width to reduce the resistance in the routes. The route 61 includes corner portions at which two pads 61a, 61b are provided. An external anode terminal 22a for inputting and an external anode terminal 22b for outputting of the capacitor C are connected to the pads 61a and 61b, respectively. Similarly, the route 62 is formed with pads 62a and 62b, which are connected to external cathode terminals 31a and 31b for inputting and outputting, respectively. Between the pads 61a and 61b is provided a route 63. The route 63 includes two bent portions 63a. With such a structure, a bypass current path P as shown in FIG. 23 is formed which enables the anode-side circuit current flowing through the route 61 to detour around the capacitor C.

With such a structure, by making the resistance of the bypass current path P low and making the inductance of the bypass current high, the DC component of the circuit current can be caused to flow into the bypass current path P to detour the capacitor C, while the AC component of the circuit current can be caused to flow into the capacitor C. Therefore, in accordance with the increase of the circuit current, the noise cancellation characteristics for a high frequency range, for example, can be enhanced while suppressing the heating of the capacitor C. The route 63 is made of copper which has relatively high conductivity and the route can be easily increased in e.g. width, which is advantageous for reducing the resistance R3. The bent portions 63a act as a coil with respect to alternating current of a high frequency range. Therefore, the inductance L3 of the bypass current path P can be increased. Since the bypass current path is formed in the electric circuit as shown in FIG. 22, the solid electrolytic capacitor need not be provided with a part solely for forming a bypass current path. Therefore, a conventional solid electrolytic capacitor of the three terminal type or the four terminal type, for example, can be used, which is convenient. Further, unlike the illustrated example, the inductance of the bypass current path can be made low by changing the configuration of the wiring pattern, for example. In such a case, high speed response can be realized in using the solid electrolytic capacitor for power supply.

Figure 24:
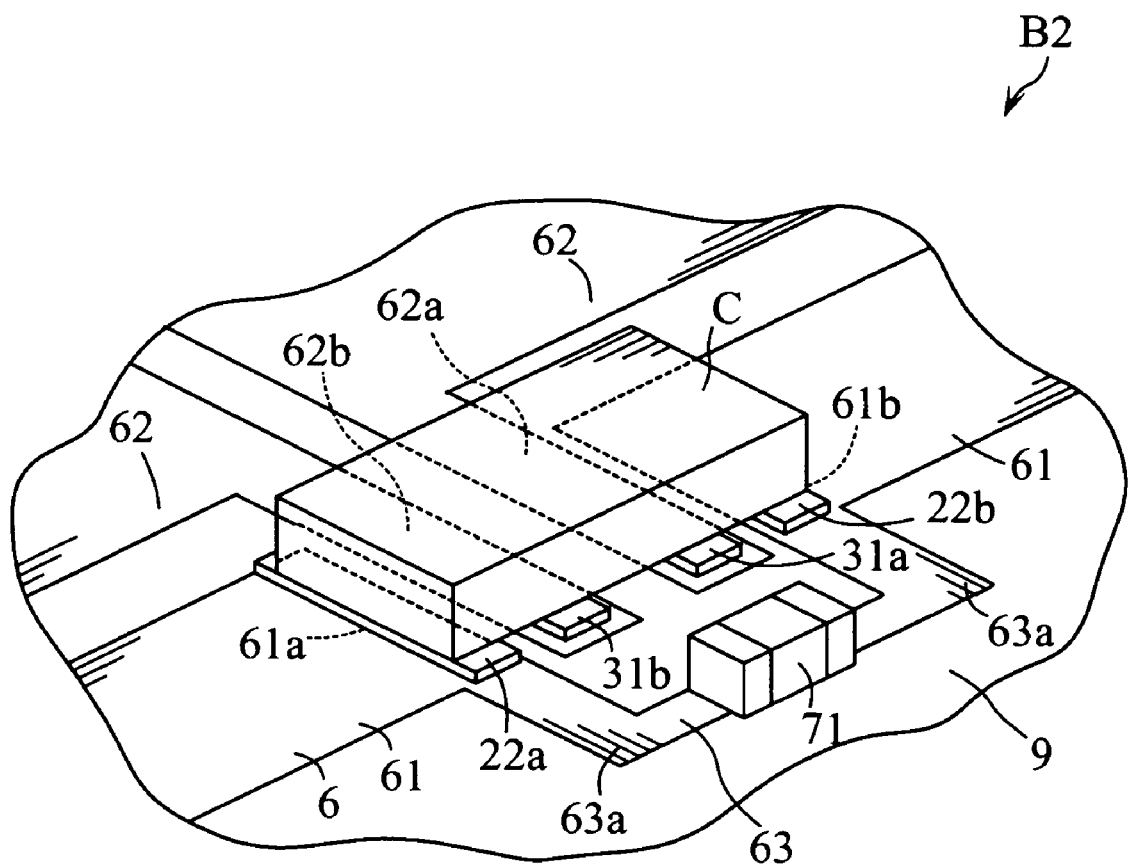
FIG. 24 is a perspective view showing a principal portion of another example of electric circuit according to the present invention.

FIG. 24 shows another example of electric circuit according to the present invention. In the illustrated electric circuit B2, a coil element 71 is provided on the route 63. With such a structure, the inductance of the bypass current path can be easily increased. Generally, a coil element has a rated inductance, so that the inductance of the bypass current path can be set accurately to a desired value.

Figure 25:
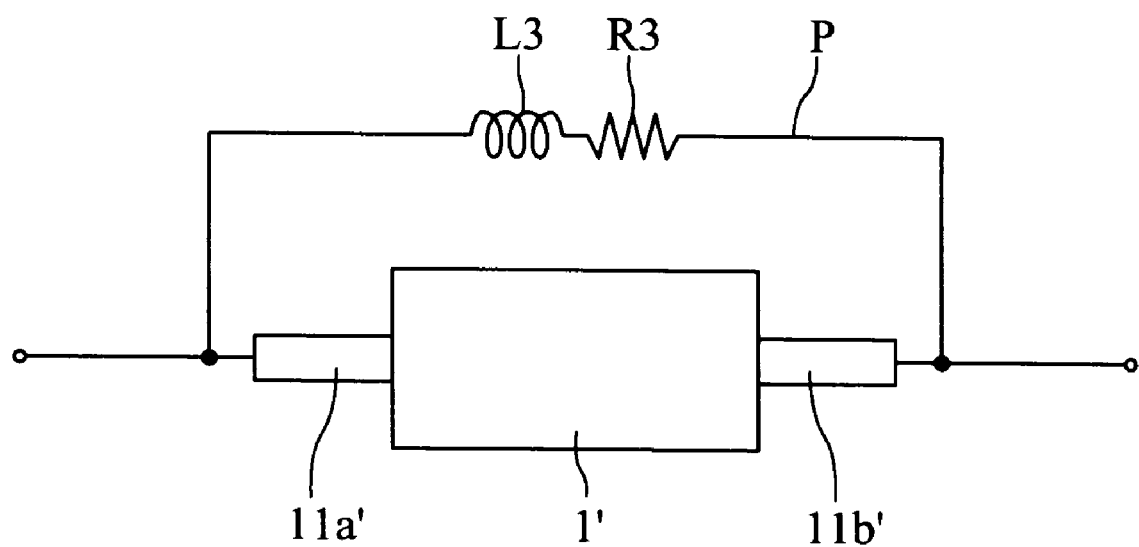
FIG. 25 illustrates the concept of the present invention.

FIG. 25 shows the concept of a solid electrolytic capacitor and an electric circuit. As shown in the figure, it is only necessary that the bypass current path P is so formed as to detour the anode body 1'. Therefore, the structural element of the bypass current path P is not limited to the metal cover or the anode conductive plate as the structural parts of a capacitor or to the wiring pattern formed on a substrate. For example, the bypass current path P may be formed by a metal member or conductive resin constituting the capacitor or a wire cord provided in the electric circuit.

In the present invention, instead of niobium or tantalum, an alloy containing niobium or tantalum may be used as the valve metal. Further, the solid electrolytic capacitor is not limited to one that includes a porous sintered body made of valve metal as the anode body, but may be an aluminum solid electrolytic capacitor, for example.

The present invention being thus described, it is apparent that the same may be varied in many ways. Such variations should not be regarded as a departure from the spirit and scope of the present invention, and all such modifications as would be obvious to those skilled in the art are intended to be included within the scope of the following claims.

The invention claimed is:

1. A solid electrolytic capacitor comprising:
   a cathode including a solid electrolytic layer;
   an anode; and
   a dielectric layer provided between the cathode and the anode;
   wherein the anode includes an anode body, an input anode terminal and an output anode terminal; and
   wherein a bypass current path for causing circuit current to detour around the anode body is formed between the input anode terminal and the output anode terminal.

2. The solid electrolytic capacitor according to claim 1, wherein an electrical resistance of the bypass current path is lower than an equivalent series resistance of the anode body.

3. The solid-electrolytic capacitor according to claim 1, wherein the cathode is provided with a cathode terminal electrically connected to the solid electrolytic layer, and wherein an inductance of the bypass current path is higher than an equivalent series resistance of a route from the input anode terminal to the cathode terminal through the anode body.

4. The solid electrolytic capacitor according to claim 1, wherein the cathode is provided with a cathode terminal electrically connected to the solid electrolytic layer, and wherein an inductance of the bypass current path is lower than an equivalent series resistance of a route from the input anode terminal to the cathode terminal through the anode body.

5. The solid electrolytic capacitor according to claim 1, wherein the anode body comprises a porous sintered body made of a valve metal, wherein each of the input anode terminal and the output anode terminal comprises a wire partially embedded in the porous sintered body, and wherein the bypass current path is provided by a conductive member connected to both of the input anode terminal and the output anode terminal.

6. The solid electrolytic capacitor according to claim 5, wherein the conductive member comprises a metal cover which covers the porous sintered body at least partially.

7. The solid electrolytic capacitor according to claim 6, wherein the metal cover includes a portion which forms the bypass current path and which is formed with a slit.

8. The solid electrolytic capacitor according to claim 6, wherein the metal cover includes a portion which forms the bypass current path and which is formed with a bent portion.

9. The solid electrolytic capacitor according to claim 6, wherein an insulating member for providing insulation between the metal cover and the porous sintered body intervenes between the cover and the sintered body.

10. The solid electrolytic capacitor according to claim 9, wherein the insulating member includes a film made of resin.

11. The solid electrolytic capacitor according to claim 9, wherein the insulating member includes a plate made of a ceramic material.

12. The solid electrolytic capacitor according to claim 6, wherein the metal cover is formed with a plurality of holes.

13. The solid electrolytic capacitor according to claim 5, further comprising a plurality of external anode terminals for surface mounting and a plurality of external cathode terminals for surface mounting, wherein each of the external anode terminals is electrically connected to the input anode terminal or the output anode terminal, whereas the external cathode terminals are electrically connected to the solid electrolytic layer.

14. The solid electrolytic capacitor according to claim 13, further comprising a metal piece including a center portion and end portions which are different in height from the center portion, wherein the center portion includes a first surface bonded to the solid electrolytic layer and a second surface which is opposite from the first surface and covered by resin, and wherein the end portions provide the external cathode terminals.

15. The solid electrolytic capacitor according to claim 13, wherein the plurality of external cathode terminals comprise a plurality of metal pieces spaced from each other.

16. The solid electrolytic capacitor according to claim 5, further comprising a cathode conductor plate provided on a bottom surface side of the porous sintered body and electrically connected to the solid electrolytic layer, and an anode conductor plate serving as the conductive member, the anode conductor plate being stacked to the cathode conductor plate via an insulating member and electrically connected to the anode terminals;
   wherein at least part of the cathode conductor plate serves as an external cathode terminal, whereas at least part of the anode conductor plate serves as a plurality of external anode terminals.

17. The solid electrolytic capacitor according to claim 16, wherein the cathode conductor plate includes a main plate portion bonded to the porous sintered body and an extension extending from the main plate portion;
   wherein the extension serves as the external cathode terminal, and wherein the main plate portion and the extension differ from each other in height so that respective bottom surfaces of the external anode terminals and the external cathode terminal are generally flush with each other.

18. The solid electrolytic capacitor according to claim 5, wherein the capacitor includes a plurality of flat porous sintered bodies.

19. The solid electrolytic capacitor according to claim 18, further comprising a plurality of external anode terminals each of which is electrically connected to input anode terminals or output anode terminals provided at the porous sintered bodies, and external cathode terminals for surface mounting electrically connected to each of the solid electrolytic capacitors formed at the porous sintered bodies.

20. The solid electrolytic capacitor according to claim 18, wherein the plurality of flat sintered bodies are stacked together.

21. The solid electrolytic capacitor according to claim 20, further comprising a plurality of metal plates intervening between the flat sintered bodies and respectively connected electrically to the solid electrolytic layers formed at the sintered bodies, wherein the external cathode terminals are stacked to the flat porous sintered bodies in the same direction as the stacking direction of the sintered bodies, and wherein the metal plates and the external cathode terminals are electrically connected to each other by a connection member extending in the stacking direction.

22. The solid electrolytic capacitor according to claim 18, wherein the plurality of flat sintered bodies are arranged in parallel.

23. An electric circuit comprising:
a solid electrolytic capacitor; and
a bypass current path;
wherein the solid electrolytic capacitor includes a cathode including a solid electrolytic layer, an anode body provided at the cathode via a dielectric layer, and an input anode terminal and an output anode terminal for enabling circuit current to flow through the anode body;
wherein the bypass current path causes the circuit current to detour around the anode body between the input anode terminal and the output anode terminal.

24. The electric circuit according to claim 23, wherein an electrical resistance of the bypass current path is lower than an equivalent series resistance of the anode body between the input anode terminal and the output anode terminal.

25. The electric circuit according to claim 23, wherein the cathode is provided with a cathode terminal electrically connected to the solid electrolytic layer, and wherein an inductance of the bypass current path is higher than an equivalent series resistance of the solid electrolytic capacitor in a route from the input anode terminal to the cathode terminal through the anode body.

26. The electric circuit according to claim 23, wherein the cathode is provided with a cathode terminal electrically connected to the solid electrolytic layer, and wherein an inductance of the bypass current path is lower than an equivalent series resistance of the solid electrolytic capacitor in a route from the input anode terminal to the cathode terminal through the anode body.

27. The electric circuit according to claim 23, wherein the solid electrolytic capacitor is mounted on a substrate, and wherein the bypass current path is provided by a wiring pattern formed on the substrate.

28. The electric circuit according to claim 27, wherein the wiring pattern is formed with a bent portion.

29. The electric circuit according to claim 23, wherein the bypass current path is provided with a coil element.

* * * * *